(12) United States Patent
Kim

(10) Patent No.: US 9,526,374 B2
(45) Date of Patent: *Dec. 27, 2016

(54) COOKING APPARATUS

(71) Applicant: Dongbu Daewoo Electronics Corporation, Seoul (KR)

(72) Inventor: Han Ju Kim, Bucheon-si (KR)

(73) Assignee: DONGBU DAEWOO ELECTRONICS CORPORATION, Seoul (KR)

(*) Notice: Subject to any disclaimer, the term of this patent is extended or adjusted under 35 U.S.C. 154(b) by 478 days.

This patent is subject to a terminal disclaimer.

(21) Appl. No.: 14/085,536

(22) Filed: Nov. 20, 2013

(65) Prior Publication Data
US 2014/0318386 A1    Oct. 30, 2014

(30) Foreign Application Priority Data

Apr. 30, 2013 (KR) .................. 10-2013-0047948

(51) Int. Cl.
*A47J 37/00* (2006.01)
*F24C 15/32* (2006.01)

(52) U.S. Cl.
CPC ............. *A47J 37/00* (2013.01); *F24C 15/322* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,892,030 A * | 1/1990 | Grieve | ........ | F27D 7/04 126/21 A |
| 5,365,833 A * | 11/1994 | Chen | ........ | F24B 1/003 126/273 R |
| 6,100,503 A * | 8/2000 | Sasaki | ........ | H05B 3/74 219/400 |
| 7,102,105 B2 * | 9/2006 | Oh | ........ | F24C 15/325 126/20 |
| 7,766,003 B2 * | 8/2010 | Kim | ........ | F24C 7/082 126/19 R |

* cited by examiner

*Primary Examiner* — Dana Ross
*Assistant Examiner* — Renee Larose

(57) ABSTRACT

A cooking apparatus includes a cavity unit having a cooking chamber, a top wall plate with an upper heater hole section, a bottom wall plate with a lower heater hole section, and a rear wall plate with an introduction hole section; a door on or over the cavity unit, configured to open and close an opening of the cavity unit; an upper heater unit on the top wall plate, configured to supply heat and/or hot air to the cooking chamber through the upper heater hole section; a lower heater unit on the bottom wall plate, configured to supply heat and/or hot air to the cooking chamber through the lower heater hole section; and a convection heater unit on the rear wall plate, configured to supply heat and/or hot air to the cooking chamber through the introduction hole section.

17 Claims, 44 Drawing Sheets

COOKING APPARATUS

CROSS-REFERENCES TO RELATED APPLICATIONS

The present application claims priority under 35 U.S.C. 119(a) to Korean Patent Application No. 10-2013-0047948 filed on Apr. 30, 2013 in the Korean Intellectual Property Office, which is incorporated herein by reference in its entirety.

BACKGROUND

Exemplary embodiments of the present disclosure relate to a cooking apparatus, and more particularly, to a cooking apparatus which can carry out not only general cooking but also frying using hot air.

In general, fried food is prepared by coating various foods such as fish, meat and vegetables with flour or frying powder and then frying the coated materials in oil.

Since oil used in frying may easily oxidize, it should be frequently exchanged with new oil. In this regard, since difficulties exist in keeping and reusing the oil once used in frying, the cooking cost may be likely to increase.

The background art of the present disclosure is disclosed in Korean Unexamined Utility Model Publication No. 1998-0044155 (published on Sep. 25, 1998 and entitled "Continuous Automatic Food Fryer").

In the case of frying a cooking object using oil, since the oil is heated to a high temperature, the probability of a safety-related accident such as a burn increases. Also, in the case where it is necessary to defrost and fry a cooking object, defrosting and frying should be carried out in separate cooking containers, which may be cumbersome or inconvenient. Further, in frying, because heat is applied more to the outside than to the inside of the cooking object, the inside and the outside of the cooking object may not be evenly cooked. Therefore, a solution to these problems is desired.

SUMMARY

One or more embodiments of the present invention relate to a cooking apparatus that can fry foods using the fat in the food (e.g., the cooking object), thereby preventing the occurrence of a safety-related accident due to oil having a high temperature.

One or more other embodiments of the present invention relate to a cooking apparatus which can simultaneously carry out defrosting and frying of a cooking object.

One or more further embodiments of the present invention relate to a cooking apparatus which can evenly cook the inside and the outside of a cooking object when frying.

In one aspect, the cooking apparatus includes a cavity unit having a cooking chamber, a top wall plate with an upper heater hole section, a bottom wall plate with a lower heater hole section, and a rear wall plate with an introduction hole section; a door on the cavity unit, configured to open and close an opening of the cavity unit; an upper heater unit on or over the top wall plate, configured to supply heat and/or hot air to the cooking chamber through the upper heater hole section; a lower heater unit on the bottom wall plate, configured to supply heat and/or hot air to the cooking chamber through the lower heater hole section; and a convection heater unit on the rear wall plate, configured to supply heat and/or hot air to the cooking chamber through the introduction hole section.

The upper heater unit may include an upper heater over the top wall plate, configured to generate heat; and an upper heater cover on or over the top wall plate configured to cover the upper heater.

The lower heater unit may include a lower heater under the bottom wall plate, configured to generate heat; and a lower heater cover on or under the bottom wall plate to cover the lower heater.

The convection heater unit may include a convection heater behind the rear wall plate, configured to generate heat; a convection fan behind the rear wall plate; a convection motor configured to rotate the convection fan; and a convection heater cover on or behind the rear wall plate, configured to cover the convection heater and the convection fan.

The cooking apparatus may further include an introduction opening and closing unit configured to open and close the introduction hole section and/or control an amount of heat supplied to the cooking chamber from the convection heater unit.

The introduction hole section may include an upper introduction hole section in an upper part of the rear wall plate; and a lower introduction hole section separate from the upper introduction hole section, in a lower part of the rear wall plate. The introduction opening and closing unit may include an upper opening and closing section for opening and closing the upper introduction hole section.

The upper opening and closing section may include upper rails on the rear wall plate, and an upper opening and closing door configured to open and close the upper introduction hole section by sliding or moving along the upper rails.

The introduction hole section may further include a side introduction hole section on one side of the rear wall plate, and the introduction opening and closing unit may further include a side opening and closing section configured to open and close the side introduction hole section.

The side opening and closing section may include side rails on the rear wall plate; and a side opening and closing door configured to open and close the side introduction hole section by sliding or moving along the side rails.

The cooking apparatus may further include a control unit configured to control operations of the upper opening and closing section and the side opening and closing section. For example, during frying, the control unit may close the upper introduction hole section and the side introduction hole section.

The cooking apparatus may further include a circulation duct unit connected to a discharge hole section in a side wall plate of the cavity unit, configured to guide air from the cooking chamber through the discharge hole section and back to the cooking chamber.

The circulation duct unit may include a circulation duct having one end connected to the discharge hole section and another end connected to a suction hole section of or in the side wall plate, configured to guide air from the discharge hole section to the suction hole section; and a duct opening and closing section in the circulation duct, configured to open and close an internal flow path of the circulation duct.

The circulation duct may have a discharge opening for discharging air from the discharge hole section out of the circulation duct. In one embodiment, the duct opening and closing section may close the discharge opening when opening the internal flow path of the circulation duct, and open the discharge opening when closing the internal flow path of the circulation duct.

Either one of the discharge hole section or the suction hole section may be in an upper part of the side wall plate, and the other one may be in a lower part of the side wall plate.

Alternatively, either one of the discharge hole section and the suction hole section may be in a front part of the side wall plate, and the other one may be in a rear part of the side wall plate.

The cooking apparatus may further include a discharge opening and closing unit on the side wall plate configured to open and close a discharge hole section in a side wall plate of the cavity unit.

The discharge opening and closing unit may include discharge rails on the side wall plate; and a discharge opening and closing door that slides or moves along the discharge rails to open and close the discharge hole section.

In another aspect, the cooking apparatus includes a cavity unit having a cooking chamber, a top wall plate with an upper heater hole section, a bottom wall plate with a lower heater hole section, and a rear wall plate with an introduction hole section; a door on the cavity unit, configured to open and close an opening of the cavity unit; an upper heater unit on the top wall plate, configured to supply heat and/or hot air to the cooking chamber through the upper heater hole section; a lower heater unit on the bottom wall plate, configured to supply heat and/or hot air to the cooking chamber through the lower heater hole section; a convection heater unit on the rear wall plate, configured to supply heat and/or hot air to the cooking chamber through the introduction hole section; and a cooking container including a housing unit that has an entrance through which hot air enters, and a support unit on the housing unit and on which one or more cooking objects (e.g., to be cooked by the heat and/or hot air) are placed. In general, during cooking, the cooking container is placed in the cooking chamber.

The cooking container may further include a cover unit that covers the support unit and/or is configured to block movement of hot air.

The cooking apparatus may further include an introduction opening and closing unit configured to open and close the introduction hole section and/or control an amount of heat to be supplied to the cooking chamber from the convection heater unit.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
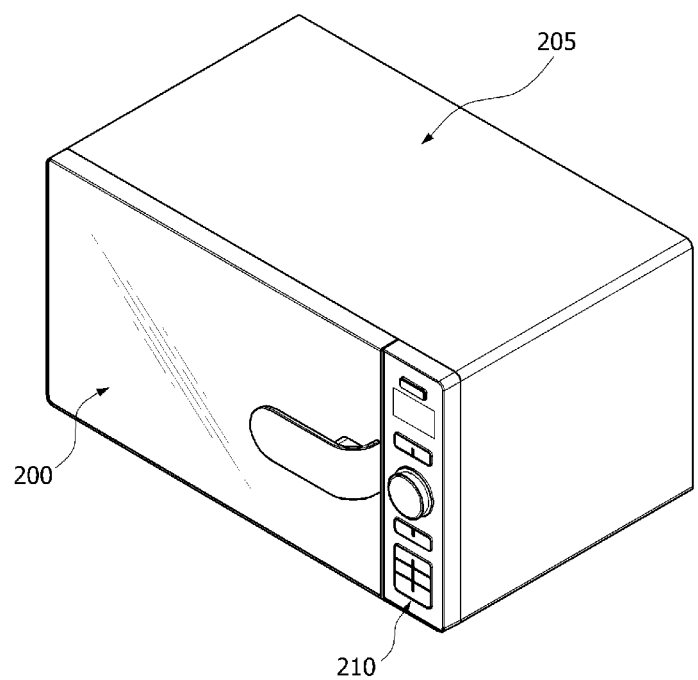
FIG. 1 is a perspective view of an exemplary cooking apparatus in accordance with one or more embodiments of the present disclosure.
Figure 2:
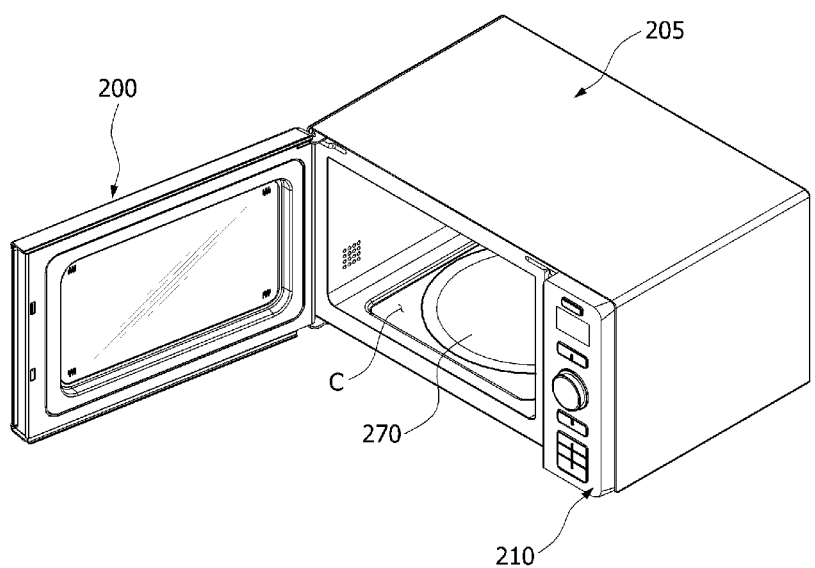
FIG. 2 is a perspective view illustrating an open door unit in the exemplary cooking apparatus in accordance with embodiment(s) of the present disclosure.
Figure 3:
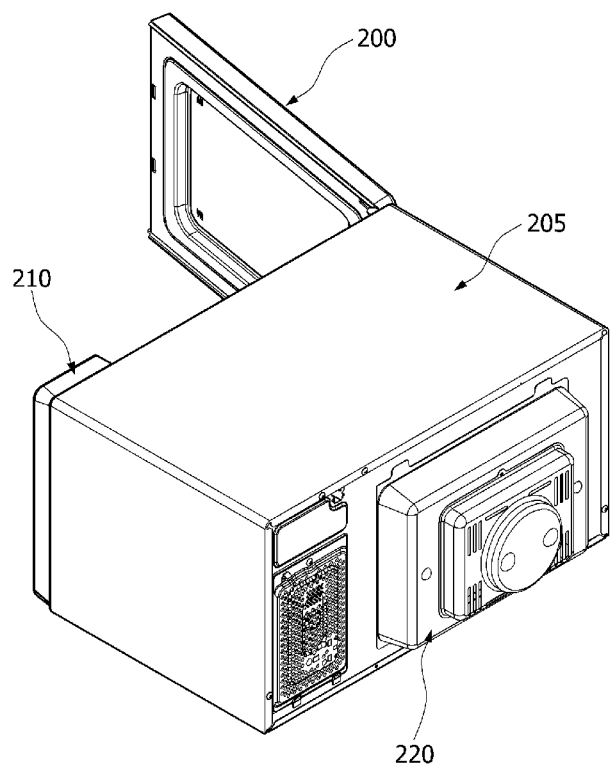
FIG. 3 is a rear perspective view illustrating the state in which the door unit is opened in the cooking apparatus in accordance with embodiment(s) of the present disclosure.
Figure 4:
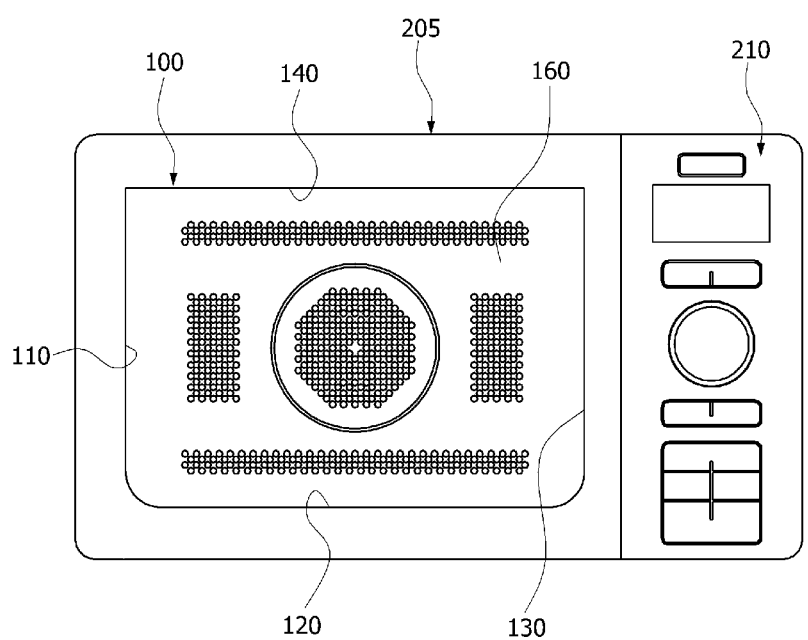
FIG. 4 is a front view schematically illustrating the cooking apparatus in accordance with embodiment(s) of the present disclosure.
Figure 5:
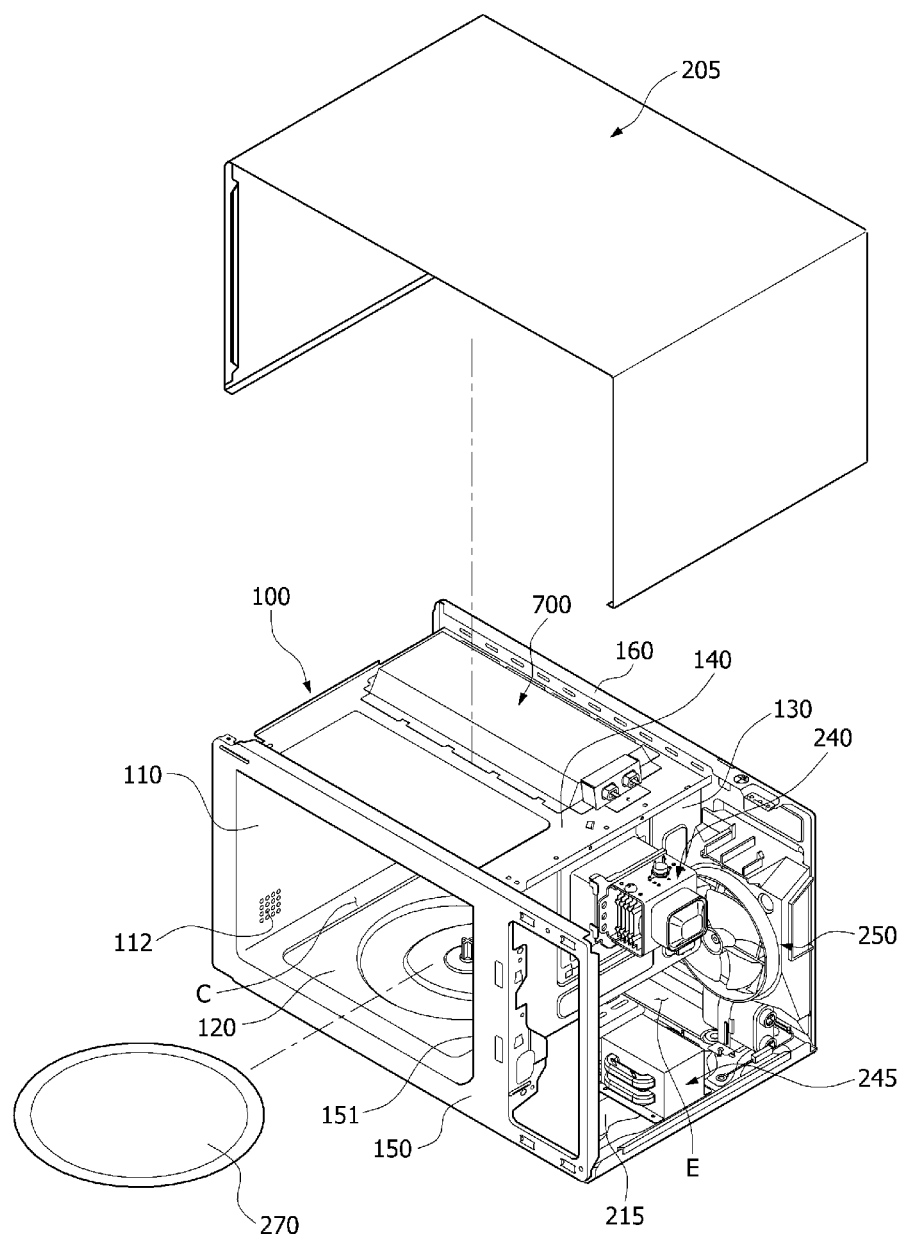
FIG. 5 is a perspective view illustrating a cavity unit and a cabinet unit are exploded in the cooking apparatus in accordance with embodiment(s) of the present disclosure.
Figure 6:
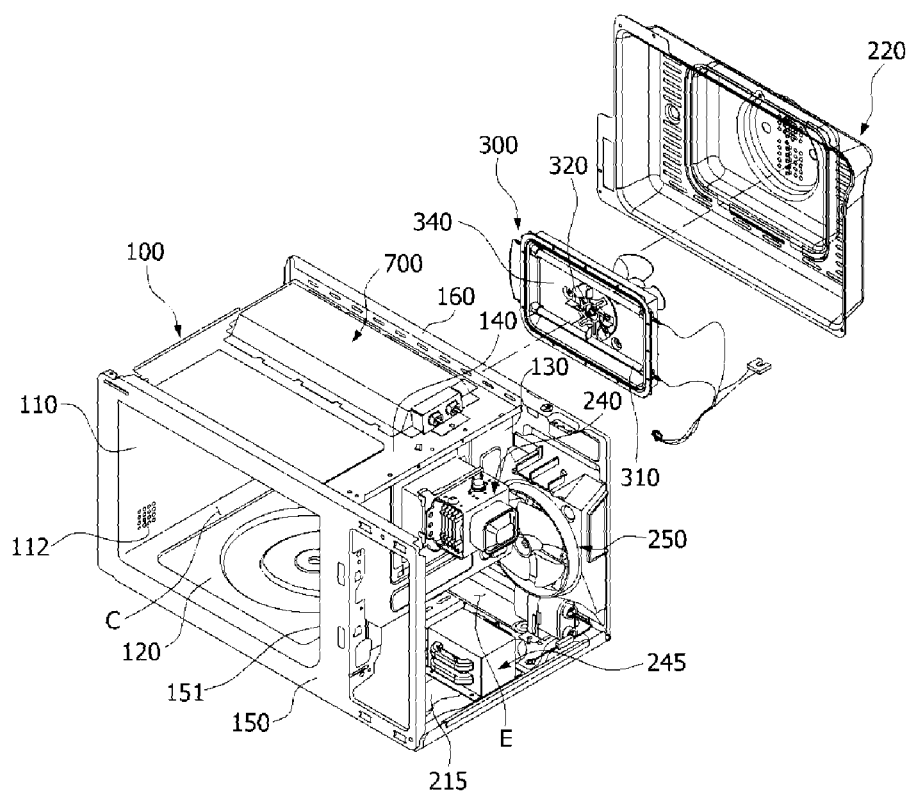
FIG. 6 is a perspective view illustrating an exploded cavity unit and convection heater unit in the exemplary cooking apparatus in accordance with embodiment(s) of the present disclosure.
Figure 7:
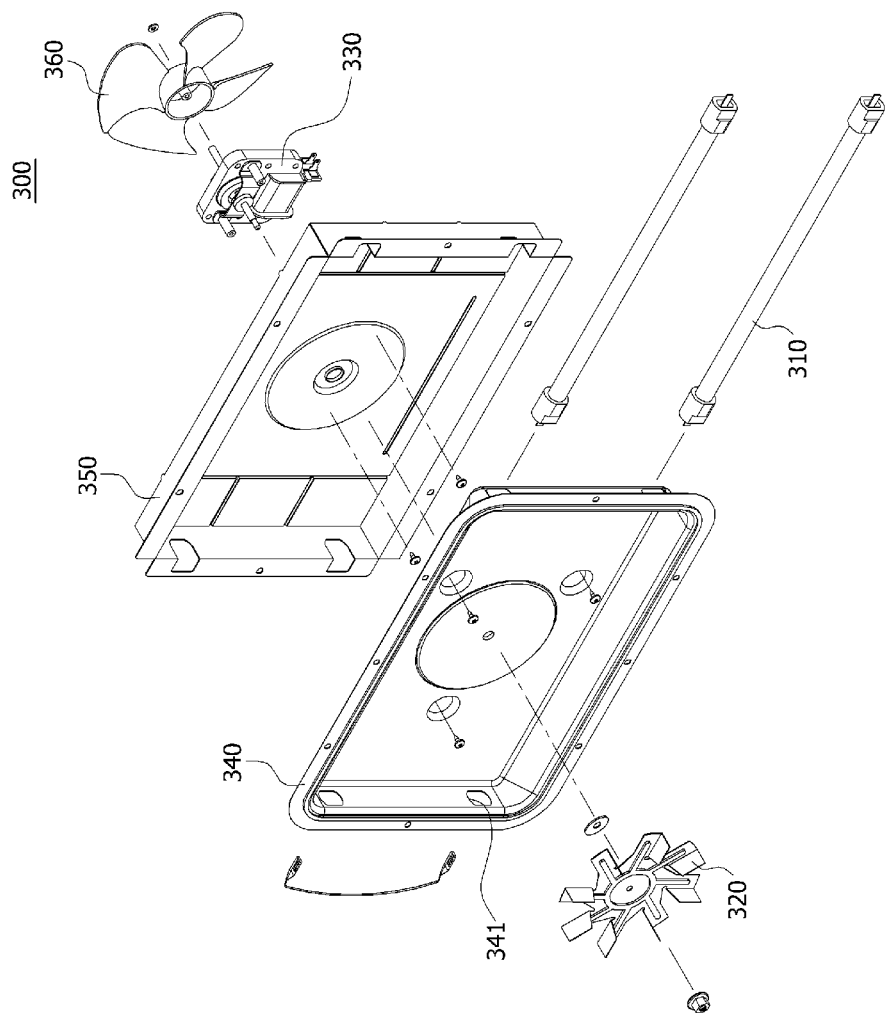
FIG. 7 is an exploded perspective view of the convection heater unit in the exemplary cooking apparatus in accordance with embodiment(s) of the present disclosure.
Figure 8:
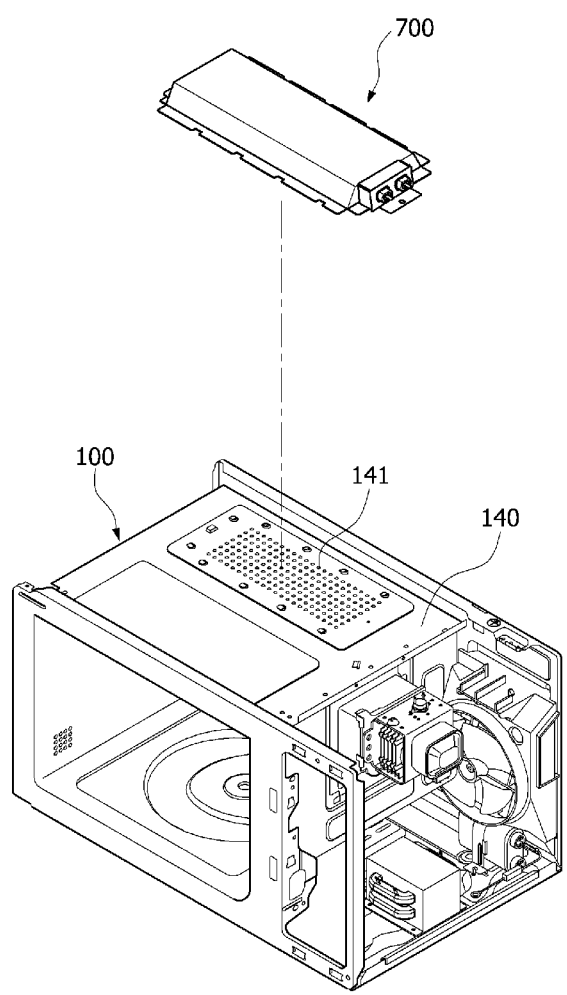
FIG. 8 is a perspective view illustrating an exploded cavity unit and upper heater unit in the exemplary cooking apparatus in accordance with embodiment(s) of the present disclosure.
Figure 9:
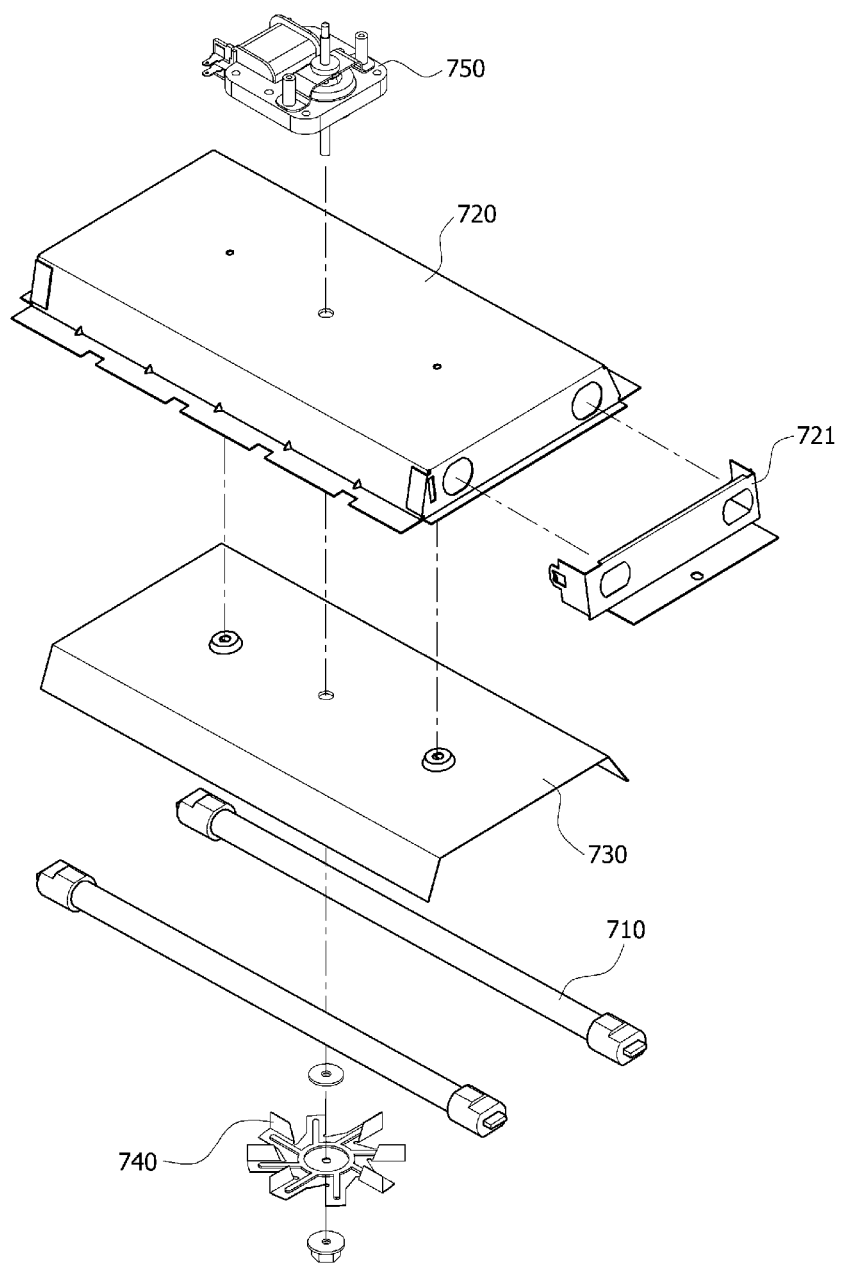
FIG. 9 is an exploded perspective view of the upper heater unit in the exemplary cooking apparatus in accordance with embodiment(s) of the present disclosure.
Figure 10:
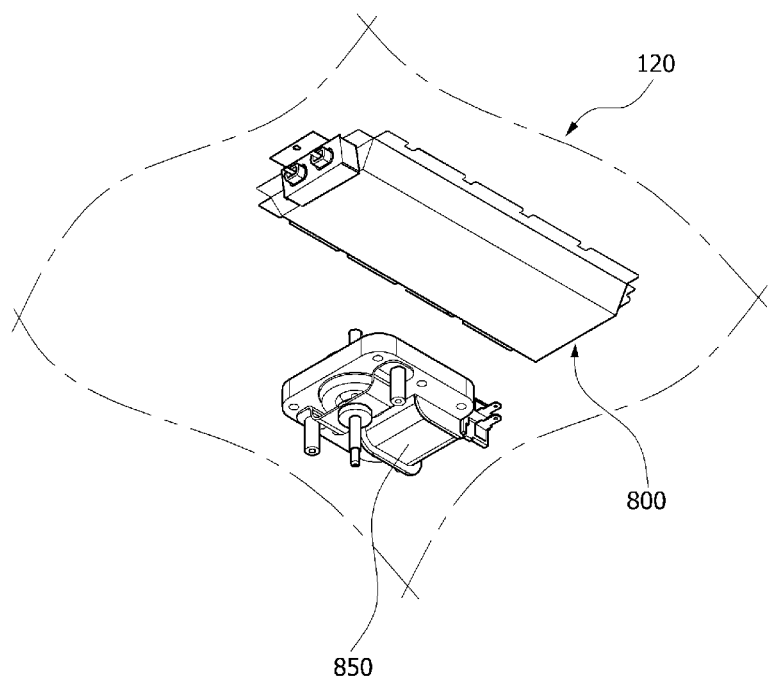
FIG. 10 is a bottom perspective view illustrating an exemplary lower heater unit mounted to a lower wall or floor in the exemplary cooking apparatus in accordance with embodiment(s) of the present disclosure.
Figure 11:
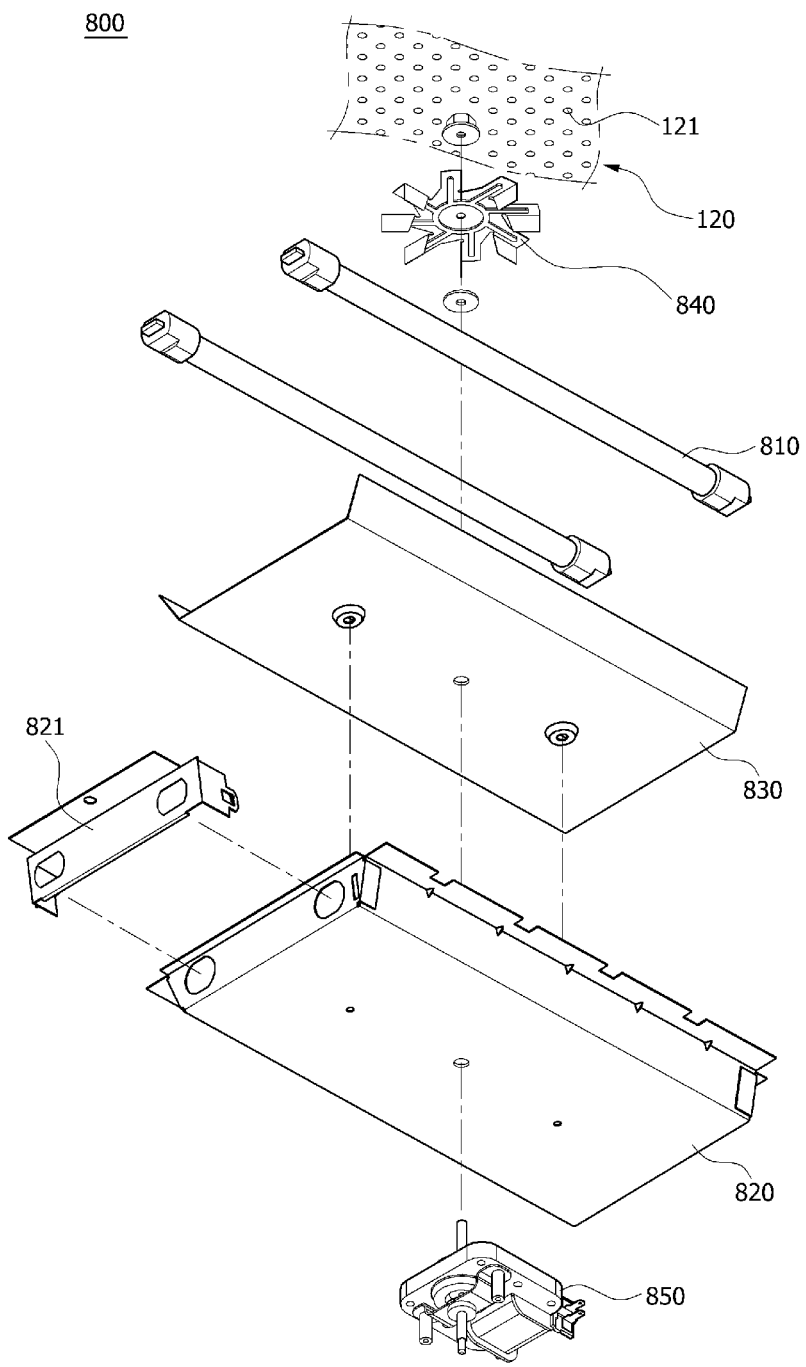
FIG. 11 is an exploded perspective view of the lower heater unit in the exemplary cooking apparatus in accordance with embodiment(s) of the present disclosure.
Figure 12:
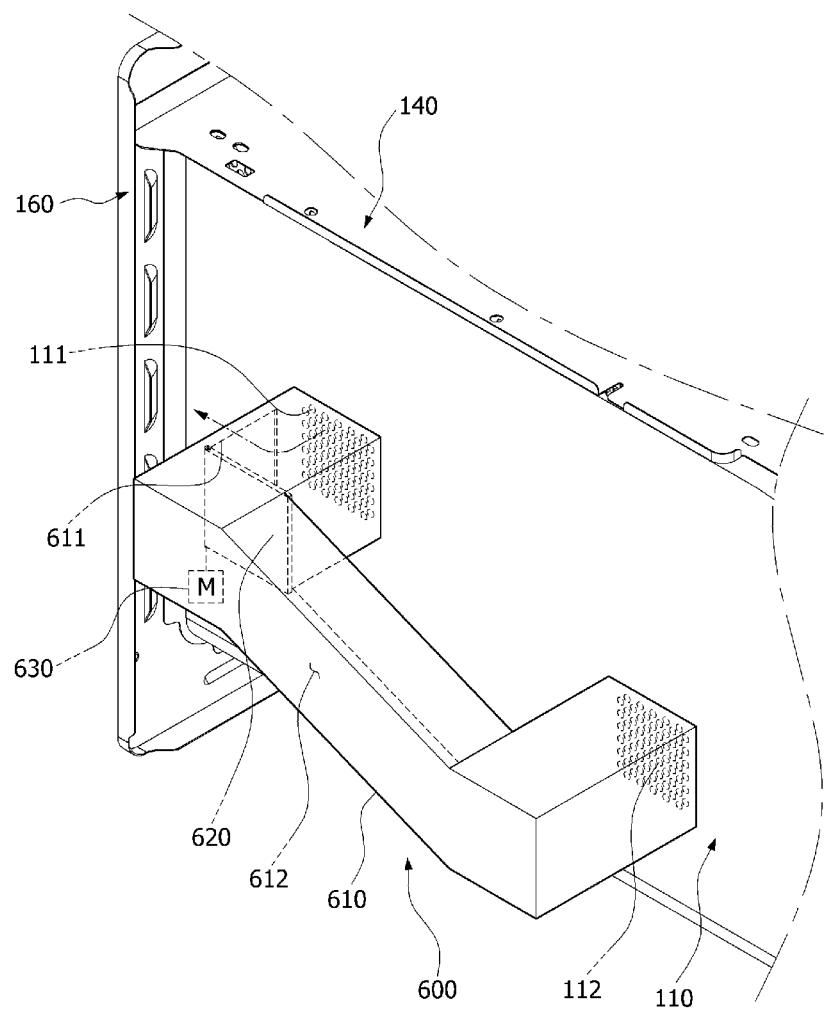
FIG. 12 is a perspective view illustrating an internal flow path of a closed circulation duct unit in the exemplary cooking apparatus in accordance with embodiment(s) of the present disclosure.
Figure 13:
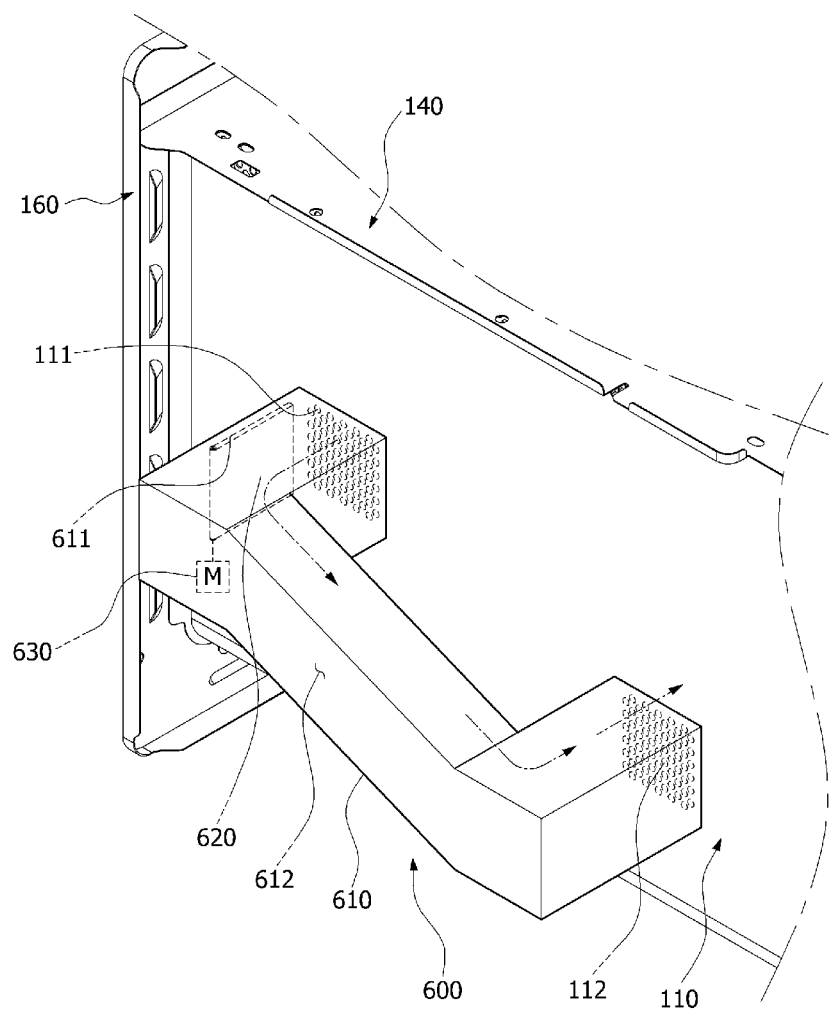
FIG. 13 is a perspective view illustrating an open internal flow path of the circulation duct unit in the exemplary cooking apparatus in accordance with embodiment(s) of the present disclosure.
Figure 14:
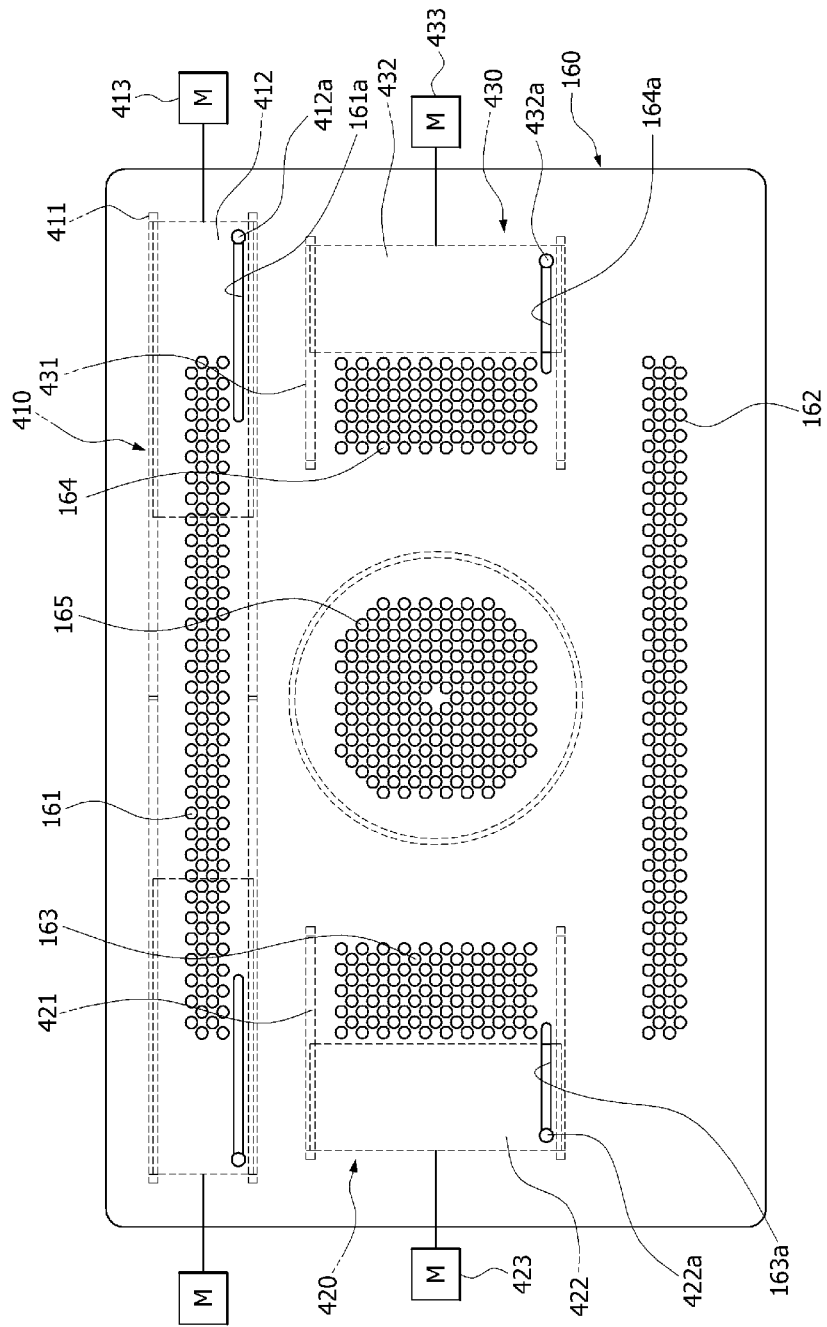
FIG. 14 is a front view illustrating open introduction hole sections of a rear wall plate in the exemplary cooking apparatus in accordance with embodiment(s) of the present disclosure.
Figure 15:
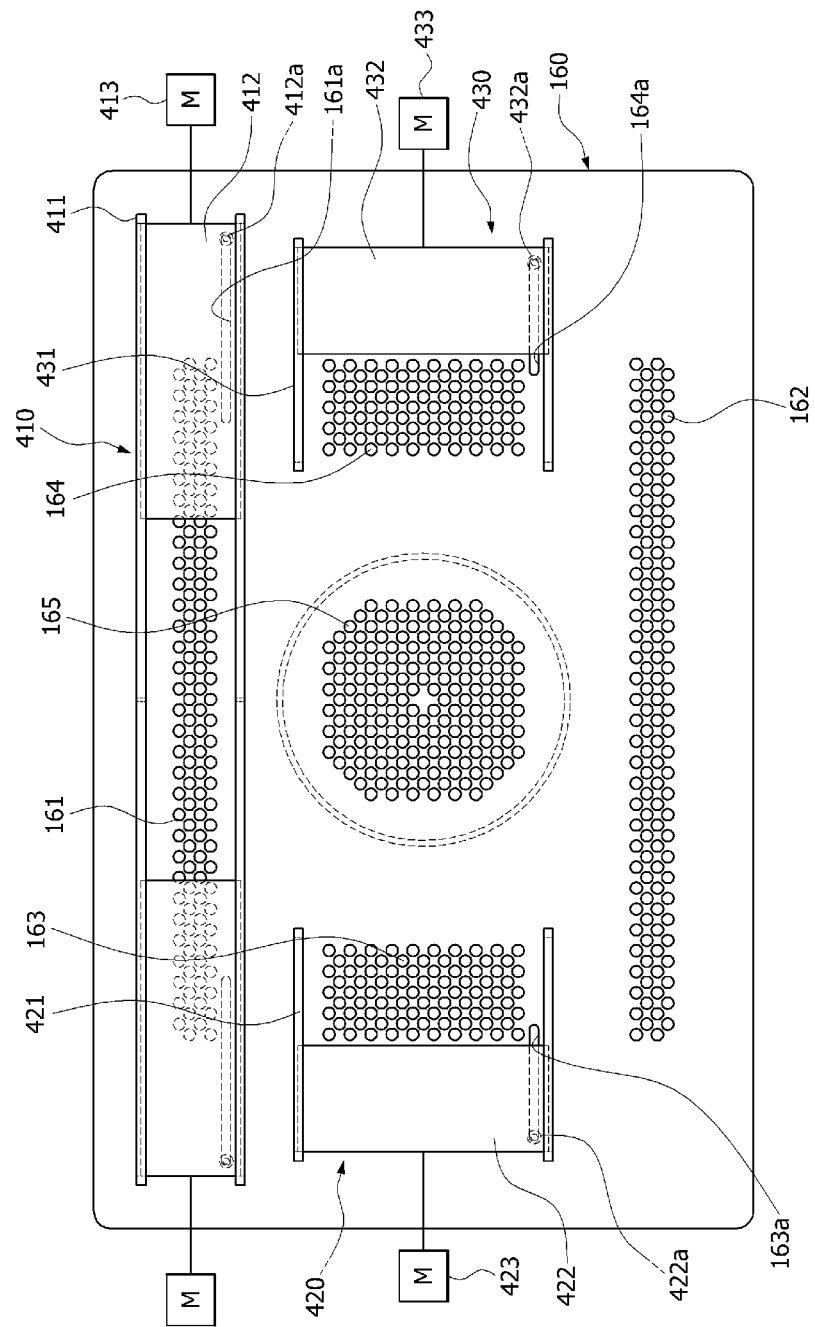
FIG. 15 is a rear view illustrating the open introduction hole sections of the rear wall plate in the exemplary cooking apparatus in accordance with embodiment(s) of the present disclosure.
Figure 16:
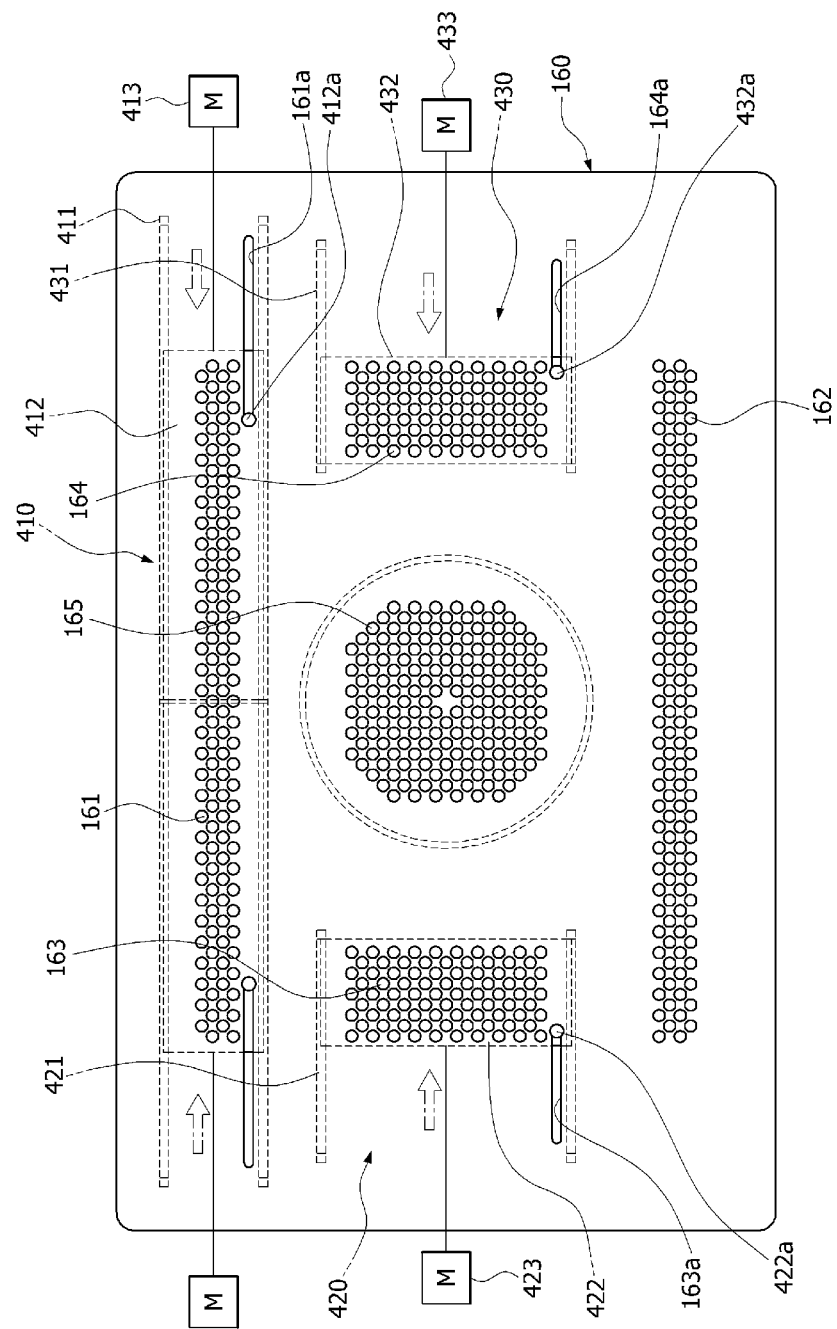
FIG. 16 is a front view illustrating closed introduction hole sections of the rear wall plate in the exemplary cooking apparatus in accordance with embodiment(s) of the present disclosure.
Figure 17:
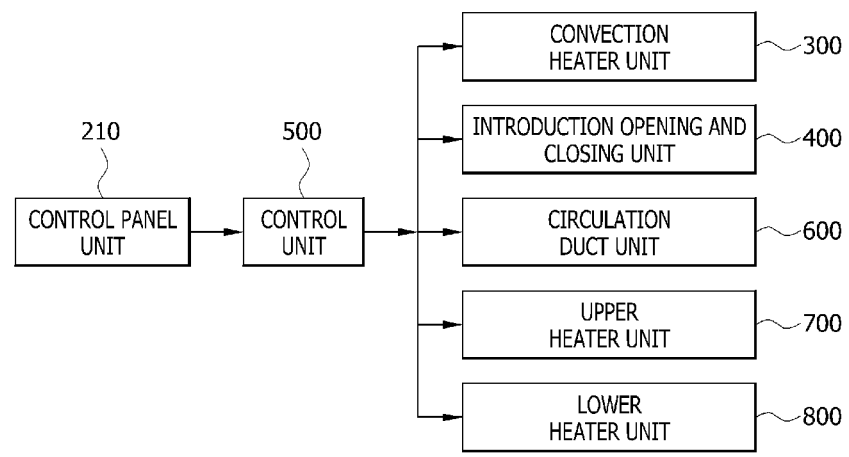
FIG. 17 is a block diagram schematically showing an exemplary control flow for a cooking apparatus in accordance with embodiment(s) of the present disclosure.

FIG. 1 is a perspective view of an exemplary cooking apparatus in accordance with one or more embodiments of the present disclosure, FIG. 2 is a perspective view illustrating an open door unit in the exemplary cooking apparatus in accordance with embodiment(s) of the present disclosure, FIG. 3 is a rear perspective view illustrating the open door unit in the exemplary cooking apparatus in accordance with embodiment(s) of the present disclosure, and FIG. 4 is a front view schematically illustrating the exemplary cooking apparatus in accordance with embodiment(s) of the present disclosure. FIG. 5 is a perspective view illustrating an exploded cavity unit and cabinet unit in the exemplary cooking apparatus in accordance with embodiment(s) of the present disclosure, FIG. 6 is a perspective view illustrating an exploded cavity unit and convection heater unit in the exemplary cooking apparatus in accordance with embodiment(s) of the present disclosure, and FIG. 7 is an exploded perspective view of the convection heater unit in the exemplary cooking apparatus in accordance with embodiment(s) of the present disclosure. FIG. 8 is a perspective view illustrating an exploded cavity unit and upper heater unit in the exemplary cooking apparatus in accordance with embodiment(s) of the present disclosure, and FIG. 9 is an exploded perspective view of the upper heater unit in the exemplary cooking apparatus in accordance with embodiment(s) of the present disclosure. FIG. 10 is a bottom perspective view illustrating an exemplary lower heater unit mounted to a lower wall or floor in the exemplary cooking apparatus in accordance with embodiment(s) of the present disclosure, and FIG. 11 is an exploded perspective view of the lower heater unit in the exemplary cooking apparatus in accordance with embodiment(s) of the present disclosure. FIG. 12 is a perspective view illustrating an internal flow path of a closed circulation duct unit in the exemplary cooking apparatus in accordance with embodiment(s) of the present disclosure, and FIG. 13 is a perspective view illustrating an open internal flow path of the circulation duct unit in the exemplary cooking apparatus in accordance with embodiment(s) of the present disclosure. FIG. 14 is a front view illustrating open introduction hole sections of a rear wall plate in the exemplary cooking apparatus in accordance with embodiment(s) of the present disclosure, FIG. 15 is a rear view illustrating the open introduction hole sections of the rear wall plate in the exemplary cooking apparatus in accordance with embodiment(s) of the present disclosure, and FIG. 16 is a front view illustrating closed introduction hole sections of the rear wall plate in the exemplary cooking apparatus in accordance with embodiment(s) of the present disclosure. FIG. 17 is a block diagram schematically showing an exemplary control flow for a cooking apparatus in accordance with embodiment(s) of the present disclosure.

Referring to FIGS. 1 to 3, 6 and 14, and possibly FIG. 17, a cooking apparatus in accordance with one or more embodiments of the present disclosure includes a cavity unit 100, a door unit 200, a cabinet unit 205, a convection heater unit 300, an introduction opening and closing unit 400, a control unit 500, an upper heater unit 700, and a lower heater unit 800.

Referring to FIGS. 2 and 4 to 6, the cavity unit 100 includes a cooking chamber C therein. Accordingly, a cooking object 60 may be put into and taken out of the cooking chamber C through the opening of the cavity unit 100, and may be cooked in the state in which it is put into the cooking chamber C.

The cavity unit 100 includes a left wall plate 110 which forms a left surface (e.g., of the cavity unit 100), a bottom wall plate 120 which forms a bottom surface (e.g., of the cavity unit 100), a right wall plate 130 which forms a right surface (e.g., of the cavity unit 100), a top wall plate 140 which forms a top surface (e.g., of the cavity unit 100), a front wall plate 150 which forms a front surface (e.g., of the cooking apparatus), and a rear wall plate 160 which forms a rear surface (e.g., of the cavity 100 and/or the cooking apparatus).

While the left wall plate 110, the bottom wall plate 120 and the right wall plate 130 may be integral with one another, the present disclosure is not limited to such an arrangement, and it is to be noted that the left wall plate 110, the bottom wall plate 120 and the right wall plate 130 may be separately formed and then integrally assembled with one another by locking members such as screws, tongue-and-groove configurations, or welds.

Referring to FIGS. 12 and 13, a discharge hole section 111 may be in the left wall plate 110. Air in the cooking chamber C may be discharged outside of the cooking chamber C through the dischar0ge hole section 111.

Due to discharge of air through the discharge hole section 111, in general cooking, it is possible to prevent a temperature inside the cooking chamber C from rising excessively and filling the inside of the cooking chamber C with steam or smoke. In this way, due to the presence of the discharge hole section 111, the cooking apparatus may stably carry out a general cooking operation.

Referring to FIGS. 2 and 4 to 6, a base section 215 which forms the base of the cooking apparatus is below the bottom wall plate 120. The base section 215 is detachably coupled to the bottom wall plate 120 by locking members, and the like.

A rotation plate driving section (not shown) is in the space between the bottom wall plate 120 and the base section 215. The rotation plate driving section is coupled to a rotation plate 270 over the bottom wall plate 120 and/or in the chamber C, by a shaft through the bottom wall plate 120. Accordingly, the rotation plate 270 is rotated by the rotation plate driving section.

The rotation plate 270 constitutes or comprises a flat circular plate, and a cooking container 1 or 2 may be placed on the rotation plate 270.

A suction mechanism (not shown) may be in, on or provided to the right wall plate 130. Air outside the cooking chamber C enter the cooking chamber C through the suction mechanism. Due to the introduction of air through the suction mechanism, in general cooking, air inside the cooking chamber C may be smoothly discharged outside of the cooking chamber C through the discharge hole section 111.

Referring to FIG. 8, the top wall plate 140 is coupled to the left wall plate 110 and the right wall plate 130 by locking members such as screws, tongue-and-groove configurations, or welds. An upper heater hole section 141 may be in the top wall plate 140. The upper heater hole section 141 defines a path through which the heat generated by upper heaters 710 is supplied to the cooking chamber C, when the upper heaters 710 are above the top wall plate 140. In some embodiments, the upper heater hole section 141 comprises a plurality of holes densely arranged or placed at substantially regular intervals.

Referring to FIGS. 2 and 4 to 6, the front wall plate 150 is coupled to the front ends of the left wall plate 110, the bottom wall plate 120, the right wall plate 130 and the top wall plate 140. A front wall hole section 151 which communicates with the cooking chamber C is in the front wall plate 150.

A control panel unit 210 is mounted, attached or affixed to the front wall plate 150. In one example, the control panel unit 210 is on one side (e.g., the right part) of the front wall plate 150, and the door unit 200 over the front wall hole section 151 is on an opposite side (e.g., the left part) of the front wall plate 150.

The control panel unit 210 includes one or more control buttons configured to select and/or initiate various cooking functions of the cooking apparatus, including a power switch. If a control button is pressed, a select signal is transferred to the control unit 500, and a selected cooking function is carried out.

Referring to FIGS. 4 and 14 to 16, an introduction hole section configured to supply air into the cooking chamber C is in the rear wall plate 160. In some embodiments, the introduction hole section includes an upper introduction hole section 161 in the upper part of the rear wall plate 160, and a lower introduction hole section 162 in the lower part of the rear wall plate 160.

The upper introduction hole section 161 and the lower introduction hole section 162 may be substantially symmetrical with respect to a discharge hole section 165 between the upper introduction hole section 161 and the lower introduction hole section 162. Accordingly, the upper introduction hole section 161 and the lower introduction hole section 162 may be separated from each other by the discharge hole section 165.

The introduction hole section may further include a left introduction hole section 163 in the left part of the rear wall plate 160, and a right introduction hole section 164 in the right part of the rear wall plate 160. In one or more embodiments, the left introduction hole section 163 and the right introduction hole section 164 are substantially symmetrical with respect to the discharge hole section 165.

The hot air produced by the convection heater unit 300 enter the cooking chamber C through the introduction hole section (e.g., the upper introduction hole section 161, the lower introduction hole section 162, the left introduction hole section 163 and/or the right introduction hole section 164).

The upper introduction hole section 161 comprises a plurality of holes densely arranged or placed at substantially regular intervals in the upper part of the rear wall plate 160. The pattern of holes in the upper introduction hole section 161 may be in a substantially rectangular, horizontally-elongated shape. In such an arrangement or configuration, the hot air produced by the convection heater unit 300 may be uniformly introduced into the cooking chamber C through the upper introduction hole section 161 without any specific directionality.

The lower introduction hole section 162 comprises a plurality of holes densely arranged or place at substantially regular intervals in the lower part of the rear wall plate 160. The pattern of holes in the lower introduction hole section 162 may be in a substantially rectangular, horizontally-elongated shape, and may be the same as the pattern of holes in the upper introduction hole section 161. In such an arrangement or configuration, the hot air produced by the convection heater unit 300 may be uniformly introduced into the cooking chamber C through the lower introduction hole section 162 without any specific directionality.

The left introduction hole section 163 comprises a plurality of holes densely arranged or placed at substantially regular intervals in the left part of the rear wall plate 160. The pattern of holes in the left introduction hole section 163 may be in a substantially rectangular, vertically-elongated shape. In such an arrangement or configuration, the hot air produced by the convection heater unit 300 may be uniformly introduced into the cooking chamber C through the left introduction hole section 163 without any specific directionality.

Similarly, the right introduction hole section 164 comprises a plurality of holes densely arranged or placed at substantially regular intervals in the right part of the rear wall plate 160. The pattern of holes in the right introduction hole section 164 may be in a substantially rectangular, vertically-elongated shape. In such an arrangement or configuration, the hot air produced by the convection heater unit 300 may be uniformly introduced into the cooking chamber C through the right introduction hole section 164 without any specific directionality.

Since the upper introduction hole section 161 and the lower introduction hole section 162, and separately, the left introduction hole section 163 and the right introduction hole section 164, may be symmetrical with respect to the discharge hole section 165, the flow of hot air induced by a convection fan 320 is not impeded by the shape and/or the disposition of the rear wall 160.

The discharge hole section 165 may be in the center of the rear wall plate 160. Accordingly, the upper introduction hole section 161 is above the discharge hole section 165, the left introduction hole section 163 is to the left of the discharge hole section 165, the lower introduction hole section 162 is below the discharge hole section 165, and the right introduction hole section 164 is to the right of the discharge hole section 165.

In one or more embodiments, the convection fan 320 is behind the discharge hole section 165. The portion of the rear wall plate 160 where the discharge hole section 165 is located may project toward the cooking chamber C, relative to the remaining portion(s) of the rear wall plate 160. Since the forward disposition of the convection fan 320 is possible, the forward and rearward length of the cooking apparatus may be decreased.

Referring to FIGS. 1 to 5, the door unit 200 is over the cavity unit 100. While it is illustrated that the door unit 200 is hingedly coupled to the front wall plate 150, the present disclosure is not limited to such an arrangement or configuration.

The door unit 200 opens or closes the opening of the cavity unit 100 (e.g., the front wall hole section 151 of the front wall plate 150). When the door unit 200 is opened, a cooking container 1, 2, 3 or 4 may be put into or taken out of the cooking chamber C, and when the door unit 200 is closed, the cooking object 60 may be heated or cooked.

The cabinet unit 205 may form the upper surface and left and right side surfaces of the cooking apparatus, and protects the cavity unit 100 and an electric outfitting room E from external forces and/or circumstances, in cooperation with the front wall plate 150 and the rear wall plate 160. The lower surface of the cooking apparatus comprises the base section 215. The base section 215 is coupled to the bottom wall plate 120, and abutted by the lower end of the cabinet unit 205. The base section 215 protects the lower surface of the cooking apparatus from external forces and/or circumstances.

Referring to FIGS. 6 and 7, the convection heater unit 300 is installed on the rear wall plate 160, and generates heat to be supplied to the cooking chamber C through the introduction hole section. In one or more embodiments, the convection heater unit 300 includes one or more (e.g., a plurality of) convection heaters 310, the convection fan 320, a convection motor 330, and a convection heater cover 340. The convection heater unit 300 may further include a convection insulating cover 350, and a convection cooling fan 360.

The convection heaters 310 are behind the rear wall plate 160, and function as a heat source to generate heat. By the heat generated by the convection heaters 310, the surroundings of the convection heaters 310, and in particular, air in the convection heater cover 340 is heated. Then, the heated air is supplied to the cooking chamber C as hot air by operation of the convection fan 320. In one or more embodiments, a pair of convection heaters 310 are individually above or below the convection fan 320, and/or on opposite sides or ends of the convection heater unit 300.

The convection fan 320 is behind the rear wall plate 160. The convection fan 320 is rotated by the convection motor 330, and moves air in the convection heater cover 340, heated by the convection heaters 310, to the cooking chamber C.

The heated air is supplied to the cooking chamber C through the introduction hole section of the rear wall plate 160. Air in the cooking chamber C moves or is guided back to the convection heater unit 300 through the discharge hole section 165 (e.g., by the air flow within the cooking chamber C), where it is heated by the convection heaters 310 and supplied back to the cooking chamber C through the introduction hole section.

The convection motor 330 is coupled to the convection fan 320 and the convection cooling fan 360, and serves as a power source for providing power. The convection motor 330 is also generally configured to rotate the convection fan 320 and the convection cooling fan 360. The convection heater cover 340 and the convection insulating cover 350 are between the convection motor 330 and the convection heaters 310.

In this arrangement or configuration, it is possible to prevent the heat generated by the convection heaters 310 from influencing or adversely affecting the convection motor 330. The power transfer shaft of the convection motor 330 is coupled to the convection fan 320 through the convection heater cover 340 and the convection insulating cover 350.

The convection heater cover 340 is mounted, affixed, attached or secured to the rear wall plate 160 by locking members such as screws or welds, to cover the convection heaters 310 and the convection fan 320. Convection heater mounting holes 341 through which the convection heaters 310 are placed may be in the convection heater cover 340. The convection heater cover 340 defines a space with a predetermined size between it and the rear wall plate 160. Accordingly, air in the space within the convection heater cover 340 may be heated by operation of the convection heaters 310.

The convection insulating cover 350 is coupled to the rear wall 160 and/or the convection heater cover 340 by locking members such as screws, tongue-and-groove configurations, welds, or an adhesive, while covering the convection heater cover 340. The convection heater cover 340 and the convection insulating cover 350 may be independently coupled to each other by locking members such as screws, tongue-and-groove configurations, or an adhesive.

The convection insulating cover 350 includes an insulating material (e.g., a material with an excellent insulation property, such as a ceramic, an insulating fiber-based insulator sheet such as fiberglass, etc.). Therefore, it is possible to restrain or prevent the heat from the convection heaters 310 from radiating or escaping outside of the convection insulating cover 350 to the back of the cooking apparatus.

The convection cooling fan 360 is coupled to the convection motor 330. The convection cooling fan 360 may rotate in an interlocked manner when the convection motor 330 operates. As a result, heat generated by the convection motor 330 may be cooled by the convection cooling fan 360. Outside air directed to the convection motor 330 by the convection cooling fan 360 may be discharged outside the cooking apparatus through a hole section in the back cover 220.

As the convection insulating cover 350 is in front of the convection motor 330 and the convection cooling fan 360 is behind the convection motor 330, it is possible to prevent the degradation of the convection motor 330 by the heat generated by the convection heaters 310 or the convection motor 330 itself.

In one or more embodiments, since the convection fan 320 and the convection cooling fan 360 may be simultaneously, sequentially and/or independently rotated using one convection motor 330, the forward and rearward length (e.g., the depth) of the cooking apparatus may be decreased or minimized, and the manufacturing cost may be reduced.

The convection heater unit 300 is covered by the back cover 220. The back cover 220 may cover the entire convection heater unit 300 including the convection motor 330 and the convection cooling fan 360, and may be detachably coupled to the rear wall plate 160 using locking members such as screws or a tongue-and-groove configuration.

Using the convection heater unit 300, air heated in the convection heater cover 340 is immediately supplied to the cooking chamber C. As a result, the cooking time may be reduced due to the direct contact between the cooking object(s) and the hot air, and cooking performance may improve.

Referring to FIGS. 5, 8 and 9, the upper heater unit 700 is on the top wall plate 140, and may comprise or constitute one or more upper heaters 710 and an upper heater cover 720. The upper heater unit 700 may further include an upper insulating cover 730, an upper fan 740, and an upper motor 750.

The upper heaters 710 are above the top wall plate 140, and may function as a heat source to generate heat. The heat generated by the upper heaters 710 heats the surroundings of the upper heaters 710, and in particular, air in the upper heater cover 720. Then, the heated air is supplied to the cooking chamber C as hot air, through the upper heater hole section 141 by operation of the upper fan 740. In one or more embodiments, a pair of upper heaters 710 may be on opposed sides or ends of the upper heater unit 700 with the upper fan 740 therebetween.

The upper heater cover 720 is mounted, attached, affixed, or secured to the top wall plate 140 by locking members such as screws, welds or tongue-and-groove configurations, to cover the upper heaters 710 and the upper fan 740. The upper heaters 710 may be mounted, affixed or secured to the upper heater cover 720 by an upper heater mounting section 721.

The upper heater cover 720 defines a space with a predetermined size between it and the top wall plate 140. Accordingly, air in the space defined by the upper heater cover 720 may be heated by the upper heaters 710.

The upper insulating cover 730 is configured to cover the upper heaters 710. The upper insulating cover 730 maybe between the upper heaters 710 and the upper heater cover 720. The upper insulating cover 730 is coupled, affixed, attached or secured to the upper heater cover 720 by locking members such as screws or an adhesive.

The upper insulating cover 730 includes an insulating material (e.g., a material with an excellent insulation property, such as a ceramic, an insulating fiber-based insulator sheet such as fiberglass, etc.). Therefore, it is possible to restrain or prevent the heat from the upper heaters 710 from radiating or escaping outside of the upper insulating cover 730 through the top of the cooking apparatus.

The upper fan 740 is above the top wall plate 140. The upper fan 740 is rotated by the upper motor 750, and supplies air from the upper heater cover 720 heated by the upper heaters 710 to the cooking chamber C. The heated air is supplied to the cooking chamber C through the upper heater hole section 141 of the top wall plate 140.

The upper motor 750 is coupled to the upper fan 740 and serves as a power source for providing power. The upper motor 750 is also generally configured to rotate the upper fan 740. The upper insulating cover 730 and the upper heater cover 720 are between the upper motor 750 and the upper heaters 710.

In this arrangement or configuration, it is possible to prevent the heat generated by the upper heaters 710 from influencing or adversely affecting the upper motor 750. The power transfer shaft of the upper motor 750 is coupled to the upper fan 740 through the upper insulating cover 730 and the upper heater cover 720.

An upper cooling fan (not shown) for cooling the upper motor 750 may also be provided to and/or included in the upper heater unit 700. The upper cooling fan may be coupled to the upper motor 750 by a shaft, and may rotate in an interlocked manner with the upper fan 740 when the upper motor 750 operates. The upper heater unit 700 is covered and protected from external forces and/or circumstances by the cabinet unit 205.

Referring to FIGS. 5 and 6, in the electric outfitting room E, there are a magnetron 240 that generates microwaves, a high voltage transformer 245 configured to supplying a high voltage to the magnetron 240, and a cooling fan section 250 configured to cooling various electric parts in the electric outfitting room E.

Referring to FIGS. 5, 10 and 11, the lower heater unit 800 is on the bottom wall plate 120, and may comprise or constitute one or more lower heaters 810 and a lower heater cover 820. The lower heater unit 800 may further include a lower insulating cover 830, a lower fan 840, and a lower motor 850.

The lower heater(s) 810 are below the bottom wall plate 120, and function as a heat source to generate heat. The heat generated by the lower heater(s) 810 heats the surroundings of the lower heater(s) 810, in particular, air in the lower heater cover 820. Then, the heated air is supplied to the cooking chamber C as hot air, through a lower heater hole section 121 by the operation of the lower fan 840. In one embodiment, a pair of lower heater(s) 810 are disposed up and down or side-by-side (e.g., laterally or horizontally) to face each other with the lower fan 840 therebetween.

The lower heater cover 820 is mounted to the bottom wall plate 120 by locking members such as screws or nuts and bolts, to cover the lower heater(s) 810 and the lower fan 840. The lower heater(s) 810 may be mounted to the lower heater cover 820 using a lower heater mounting section 821.

The lower heater cover 820 defines a space with a predetermined size between it and the bottom wall plate 120. Accordingly, air in the space defined by the lower heater cover 820 may be heated by the operation of the lower heater(s) 810.

The lower insulating cover 830 is configured to cover the lower heater(s) 810 and is between the lower heater(s) 810 and the lower heater cover 820. The lower insulating cover 830 is coupled to the lower heater cover 820 by locking members such as screws or nuts and bolts, and the same locking members that secure the lower heater cover 820 to the bottom wall plate 120 can secure the lower heater cover 820 in place.

The lower insulating cover 830 includes an insulating material, that is, a material with an excellent insulation property. Therefore, it is possible to inhibit or prevent the heat generated by the lower heater(s) 810 from escaping through the lower insulating cover 830.

The lower fan 840 is below the bottom wall plate 120. The lower fan 840 is rotated by the power provided from the lower motor 850, and supplies air in the lower heater cover 820 which is heated by the lower heater(s) 810 to the cooking chamber C. The heated air (that is, hot air) is supplied to the cooking chamber C through the lower heater hole section 121 of the bottom wall plate 120.

The lower motor 850 is coupled to the lower fan 840 and serves as a power source for providing power to the lower fan 840 and optionally to the lower heater(s) 810. The lower insulating cover 830 and the lower heater cover 820 are between the lower motor 850 and the lower heater(s) 810.

As a result, it is possible to inhibit or prevent the heat generated by the lower heater(s) 810 from adversely affecting the lower motor 850. The power transfer shaft of the lower motor 850 is coupled to the lower fan 840 through the lower insulating cover 830 and the lower heater cover 820.

A lower cooling fan (not shown) for cooling the lower motor 850 may be additionally provided to the lower heater unit 800. The lower cooling fan may be coupled to the lower motor 850 by a shaft that rotates the lower cooling fan in an interlocked manner when the lower motor 850 operates. The lower heater unit 800 is covered and protected from external circumstances and/or forces by the base section 215.

Referring to FIGS. 4 and 14 to 17, the introduction opening and closing unit 400 opens and closes an introduction hole section, and controls the amount of heat supplied to the cooking chamber C. In one embodiment, the introduction opening and closing unit 400 may comprise or constitute an upper opening and closing section 410. In the case where the introduction opening and closing unit 400 further comprises side introduction hole sections 163 and 164, the introduction opening and closing unit 400 may further include side opening and closing sections 420 and 430.

The upper opening and closing section 410 opens and closes the upper introduction hole section 161, generally according to the cooking mode. In a general cooking mode, the upper opening and closing section 410 opens the upper introduction hole section 161, introducing the air heated by the convection heater unit 300 into the cooking chamber C through the upper introduction hole section 161. Conversely, in a frying mode, the upper opening and closing section 410 closes the upper introduction hole section 161, introducing heated air into the cooking chamber C through the lower introduction hole section 162, opposite to the upper introduction hole section 161.

In the present invention, a cooking object is fried using the fat or fat constituent in the cooking object itself. Alternatively, if desired, the cooking object may be sprayed or at least partially coated with a very small or light amount of oil prior to frying. In frying, the cooking object is placed in the cooking container 1, 2, 3 or 4 which may be for air frying (e.g., configured to fry the cooking object with hot air), using at least one of the heater units 300 and 700. Accordingly, in one or more embodiments, frying may be referred to as "air frying."

The upper opening and closing section 410 includes upper rails 411 and upper opening and closing doors 412. The upper rails 411 may be on the front or rear surface of the rear wall plate 160. A pair of upper rails 411 are above and below the upper introduction hole section 161, and may be configured to face each other. The upper opening and closing doors 412 fit between the upper rails 411, and the sliding movement of the upper opening and closing doors 412 is guided by the upper rails 411.

The upper rails 411 and the upper opening and closing doors 412 may comprise a heat-resistant material to reduce or minimize degradation of the upper rails 411 and the upper opening and closing doors 412 by the hot air produced by the convection heater unit 300.

Upper opening and closing knobs 412a may be on the upper opening and closing doors 412. The rear wall plate 160 may further comprise upper slots 161a therein, corresponding to the upper opening and closing knobs 412a.

The upper opening and closing knobs 412a may be on the front or rear surfaces of the upper opening and closing doors 412 and may pass through the upper slots 161a. As a user moves the upper opening and closing knobs 412a, which may project into the cooking chamber C through the rear wall plate 160, left or right, the upper opening and closing doors 412 may be slid or moved leftward or rightward. The leftward and rightward movement of the upper opening and closing knobs 412a is guided and/or controlled by the upper slots 161a. Accordingly, the upper slots 161a may have a length corresponding to the leftward and rightward movement length or distance of the upper opening and closing knobs 412a.

In this way, the user may manually open or close the upper introduction hole section 161 by opening or closing the upper opening and closing doors 412 according to the cooking mode.

The upper opening and closing unit 410 may further include upper opening and closing driving sections 413. The upper opening and closing driving sections 413 are connected to the upper opening and closing doors 412 and control and/or implement leftward and rightward sliding movement of the upper opening and closing doors 412 automatically. That is, the upper opening and closing driving sections 413 automatically open or close the upper introduction hole section 161 by opening or closing the upper opening and closing doors 412 under the control of the control unit 500 when a cooking mode is selected using the control panel unit 210.

The upper opening and closing driving sections 413, which may be capable of automatically realizing the leftward and rightward sliding movement of the upper opening and closing doors 412, may comprise motors and/or mechanical cylinders.

While it is illustrated that the upper opening and closing doors 412 and the upper opening and closing driving sections 413 are on the left and right and/or at each side of the upper introduction holes 161, the present disclosure is not limited to such an arrangement and/or configuration, and other arrangements and/or configurations may be possible as long as the upper introduction hole section 161 may be opened or closed according to the cooking mode.

The side opening and closing sections 420 and 430 open and close the left and right introduction hole sections 163 and 164, respectively, and may comprise a left opening and closing section 420 and a right opening and closing section 430.

First, the left opening and closing section 420 opens and closes the left introduction hole section 163. The left opening and closing section 420 opens and closes the left introduction hole section 163 according to the cooking mode. In a general cooking mode, the left opening and closing section 420 opens the left introduction hole section 163, and the air heated by the convection heater unit 300 enter the cooking chamber C through the left introduction hole section 163. Conversely, in the frying mode, the left opening and closing section 420 may close the left introduction hole section 163, and heated air may enter the cooking chamber C through the lower introduction hole section 162.

The left opening and closing section 420 includes left rails 421 and a left opening and closing door 422. The left rails 421 are on the front or rear surface of the rear wall plate 160. A pair of left rails 421 are above and below the left introduction hole section 163 and may face or be opposed to each other. The left opening and closing door 422 fits between the left rails 421, and the sliding movement of the left opening and closing door 422 is guided or controlled by the pair of left rails 421.

The left rails 421 and the left opening and closing door 422 may comprise a heat-resistant material to reduce or minimize degradation of the left rails 421 and the left opening and closing door 422 by the hot air produced by the convection heater unit 300.

A left opening and closing knob 422a may be on the left opening and closing door 422. The rear wall plate 160 may further comprise a left slot 163a therein, corresponding to the left opening and closing knob 422ain.

The left opening and closing knob 422a may be on the front or rear surface of the left opening and closing door 422 and passes through the left slot 163a. As the user moves the left opening and closing knob 422a, which may project into the cooking chamber C through the rear wall plate 160, left or right, the left opening and closing door 422 may be slid or moved leftward or rightward. The leftward and rightward movement of the left opening and closing knob 422a is guided and/or controlled by the left slot 163a. Accordingly, the left slot 163a may have a length corresponding to the leftward and rightward movement length or distance of the left opening and closing knob 422a.

In this way, the user may manually open or close the left introduction hole section 163 using the left opening and closing door 422 according to the cooking mode.

The left opening and closing unit 420 may further include a left opening and closing driving section 423. The left opening and closing driving section 423 is connected to the left opening and closing door 422, and can control and/or implement leftward and rightward sliding movement of the left opening and closing door 422 automatically. That is to say, the left opening and closing driving section 423 automatically opens or closes the left introduction hole section 163 using the left opening and closing door 422 under the control of the control unit 500 when the cooking mode is selected using the control panel unit 210.

The left opening and closing driving section 423, which may be capable of automatically realizing the leftward and rightward sliding movement of the left opening and closing door 422, may comprise a motor and/or a mechanical cylinder.

Next, the right opening and closing section 430 opens and closes the right introduction hole section 164. The right opening and closing section 430 may open and close the right introduction hole section 164 according to the cooking mode. In a general cooking mode, the right opening and closing section 430 opens the right introduction hole section 164, and the air heated by the convection heater unit 300 enter the cooking chamber C through the right introduction hole section 164. Conversely, in a frying mode, the right opening and closing section 430 may close the right introduction hole section 164, and heated air may enter the cooking chamber C through only the lower introduction hole section 162.

The right opening and closing section 430 may include right rails 431 and a right opening and closing door 432. The right rails 431 are on the front or rear surface of the rear wall plate 160. A pair of right rails 431 are above and below the right introduction hole section 164, and may face or be opposed to each other. The right opening and closing door 432 fits between the right rails 431, and the sliding movement of the right opening and closing door 432 is guided and/or controlled by the pair of right rails 431.

The right rails 431 and the right opening and closing door 432 may comprise a heat-resistant material to reduce or minimize degradation of the right rails 431 and the right opening and closing door 432 by the hot air produced by the convection heater unit 300.

A right opening and closing knob 432a may be on the right opening and closing door 432. The rear wall plate 160 may further comprise a right slot 164a therein, corresponding to the right opening and closing knob 432a.

The right opening and closing knob 432a may be on the front or rear surface of the right opening and closing door 432 and may pass through the right slot 164a. As a user moves the right opening and closing knob 432a, which may project into the cooking chamber C through the rear wall plate 160, left or right, the right opening and closing door 432 may be slid or moved leftward or rightward. The leftward and rightward movement of the right opening and closing knob 432a is guided and/or controlled by the right slot 164a. Accordingly, the right slot 164a may have a length corresponding to the leftward and rightward movement length or distance of the right opening and closing knob 432a.

In this way, the user may manually open or close the right introduction hole section 164 using the right opening and closing door 432 according to the cooking mode.

The right opening and closing unit 430 may further include a right opening and closing driving section 433. The right opening and closing driving section 433 is connected to the right opening and closing door 432 and may realize, control and/or implement leftward and rightward sliding movement of the right opening and closing door 432 automatically. That is, the right opening and closing driving section 433 automatically opens or closes the right introduction hole section 164 using the right opening and closing door 432 under the control of the control unit 500 when the cooking mode is selected using the control panel unit 210.

The right opening and closing driving section 433, which may automatically realize or implement the leftward and rightward sliding movement of the right opening and closing door 432, may comprise a motor and/or a mechanical cylinder.

In one embodiment, the control unit 500 closes the upper opening and closing section 410 and the side opening and closing sections 420 and 430 in frying mode, so that the upper introduction hole section 161 and the left and right introduction hole sections 163 and 164 are respectively closed. In this embodiment, the hot air produced from the convection heater unit 300 is supplied to the cooking chamber C only through the lower introduction hole section 162. In other words, in frying mode, hot air may be concentrated and/or supplied to the cooking chamber C through only the lower introduction hole section 162. Alternatively, in frying mode, the control unit 500 may completely close the upper opening and closing section 410, but only partially close the side opening and closing sections 420 and 430, or leave the side opening and closing sections 420 and 430 open. As a result, hot air supplied to the cooking chamber C may be concentrated through the lower introduction hole section 162.

Meanwhile, in the general cooking mode, the control unit 500 opens the upper opening and closing section 410 and the side opening and closing sections 420 and 430, so that the upper introduction hole section 161 and the left and right introduction hole sections 163 and 164 are open. Accordingly, the hot air produced from the convection heater unit 300 is supplied to the cooking chamber C through the upper introduction hole section 161, the lower introduction hole section 162 and the left and right introduction hole sections 163 and 164. In other words, hot air may be uniformly supplied to the cooking chamber C (e.g., in upward, downward, leftward and rightward directions).

Referring to FIGS. 12, 13 and 17, the cooking apparatus in accordance with one or more embodiments of the present disclosure may further include a circulation duct unit 600.

The circulation duct unit 600 may be connected to the discharge hole section 111 of the left wall plate 110, and is configured to guide the air discharged out of the cooking chamber C through the discharge hole section 111 back to the cooking chamber C.

The circulation duct unit 600 may include a circulation duct 610 and a duct opening and closing section 620. The circulation duct 610 may have a duct-like shape (e.g., with a substantially square, rectangular, circular, oval, etc. cross-section) and an internal flow path 612. The circulation duct 610 may be mounted, affixed, or attached to, or integrated with, the outer surface of the left wall plate 110 (e.g., to the left wall plate 110 outside the cooking chamber C).

One end of the circulation duct 610 is connected to and/or overlapping the discharge hole section 111, and another end of the circulation duct 610 is connected to and/or overlapping a suction hole section 112. Accordingly, the air discharged through the discharge hole section 111 may be guided to the suction hole section 112 along the internal flow path 612 of the circulation duct 610.

A discharge opening 611 may be in the circulation duct 610. The discharge opening 611 may be on one sidewall of the circulation duct 610 adjacent to the discharge hole section 111. Accordingly, the air discharged through the discharge hole section 111 may be discharged out of the circulation duct 610 through the discharge opening 611.

In this way, when air in the cooking chamber C enters the circulation duct 610 through the discharge hole section 111, air may be guided back into the cooking chamber C along the internal flow path 612 or may be discharged out of the circulation duct 610 through the discharge opening 611. Such air flow depends on the duct opening and closing section 620 in the circulation duct 610.

The duct opening and closing section 620 is rotatable and configured to open and close the internal flow path 612 of the circulation duct 610. The duct opening and closing section 620 may be coupled to the circulation duct 610 using one or more hinges, and may be coupled to a duct driving section 630 outside the circulation duct 610. Accordingly, as the duct opening and closing section 620 is rotated by the duct driving section 630, the duct opening and closing section 620 opens or closes the internal flow path 612 of the circulation duct 610. The duct opening and closing section 620 is adjacent to the discharge opening 611 and is capable of opening and closing (and/or configured to open and close) the discharge opening 611.

In the case where the duct opening and closing section 620 opens the internal flow path 612 of the circulation duct 610, the duct opening and closing section 620 may close the discharge opening 611. That is to say, the opening of the internal flow path 612 and the closing of the discharge opening 611 may be simultaneously implemented through only the operation of the duct opening and closing section 620. Thus, when air in the cooking chamber C enters the circulation duct 610 through the discharge hole section 111, air is naturally supplied back to the cooking chamber C through the internal flow path 612.

The control unit 500 operates the duct opening and closing section 620 to open the internal flow path 612 of the circulation duct 610 in frying mode. Accordingly, since the air discharged out of the cooking chamber C through the discharge hole section 111 is circulated back to the cooking chamber C through the suction hole section 112, heat loss may be suppressed or minimized as a result of discharging the air in the cooking chamber C.

One of the discharge hole section 111 and the suction hole section 112 may be in the upper part of the side wall plate 110 and/or 130, and the other of the discharge hole section 111 and the suction hole section 112 may be in the lower part of the side wall plate 110 and/or 130. In one or more embodiments, the discharge hole section 111 is in the upper part of the left wall plate 110, and the suction hole section 112 is in the lower part of the left wall plate 110. Since air in the cooking chamber C is discharged through the upper discharge hole section 111, and air is introduced into the cooking chamber C through the lower suction hole section 112, air circulation efficiency, in particular, the upward and/or downward circulation efficiency in the cooking chamber C, may be improved through the discharge and introduction of air through the discharge hole section 111 and the suction hole section 112, respectively. Hence, as air circulation is actively implemented in the cooking chamber C, the cooking time of the cooking object(s) may be reduced or reduced or shortened, and the cooking performance may be improved.

One of the discharge hole section 111 and the suction hole section 112 may be in the front part of the side wall plate 110 and/or 130, and the other of the discharge hole section 111 and the suction hole section 112 may be in the rear part of the side wall plate 110 and/or 130. In one or more embodiments, the discharge hole section 111 is in the rear part of the left wall plate 110, and the suction hole section 112 is in the front part of the left wall plate 110. Since air in the cooking chamber C is discharged through the rear discharge hole section 111, and air enter the cooking chamber C through the front suction hole section 112, air circulation efficiency, in particular, the upward and downward circulation efficiency in the cooking chamber C, may be improved through the discharge and introduction of air through the discharge hole section 111 and the suction hole section 112, respectively. Hence, as air circulation is actively implemented in the cooking chamber C, the cooking time of the cooking object(s) may be reduced or shortened, and the cooking performance may be improved.

In the case where the duct opening and closing section 620 closes the internal flow path 612 of the circulation duct 610, the duct opening and closing section 620 may operate to open the discharge opening 611. That is to say, the closing of the internal flow path 612 and the opening of the discharge opening 611 may be simultaneously implemented through the operation of the duct opening and closing section 620. Thus, when air in the cooking chamber C enters the circulation duct 610 through the discharge hole section 111, air is naturally discharged outside of the circulation duct 610 through the discharge opening 611.

The control unit 500 closes the duct opening and closing section 620 (and the internal flow path 612 of the circulation duct 610) in the general cooking mode. Accordingly, the air discharged out of the cooking chamber C through the discharge hole section 111 is discharged outside of the circulation duct 610 through the discharge opening 611. Due to the discharge of air from the cooking chamber C by the discharge hole section 111 and the discharge opening 611 in this way, it is possible to prevent the temperature inside the cooking chamber C from rising excessively and/or filling the inside of the cooking chamber C with steam or smoke in the general cooking mode.

The cooking apparatus in accordance with embodiment(s) of the present disclosure may simultaneously include the introduction opening and closing unit 400 and the circulation duct unit 600, or may include only the circulation duct unit 600 but not the introduction opening and closing unit 400.

As is apparent from the above descriptions, in the cooking apparatus in accordance with embodiment(s) of the present disclosure, not only general cooking but also frying, and in particular, air frying, may be carried out using a single cooking apparatus. As a result, user convenience may be improved.

Also, in the cooking apparatus in accordance with embodiment(s) of the present disclosure, since frying may be carried out using the fat in the cooking object(s) without any need to separately supply oil to or on the cooking object(s), it is possible to prevent or reduce the likelihood of a safety-related accident due to oil having a high temperature, and the cooking cost may be reduced due to nonuse of oil.

Further, in the cooking apparatus in accordance with embodiment(s) of the present disclosure, since frying may be immediately carried out through heater units without the need to move or turn the cooking object(s), optionally after defrosting the cooking object(s) using microwaves, user convenience may be improved.

Moreover, in the cooking apparatus in accordance with embodiment(s) of the present disclosure, since frying as a main cooking mode may be carried out using hot air from heater units, optionally after provisionally, initially and/or partially cooking the cooking object(s) using microwaves, the inside and the outside of the cooking object(s) may be evenly cooked, and a crispy texture may be realized.

Figure 18:
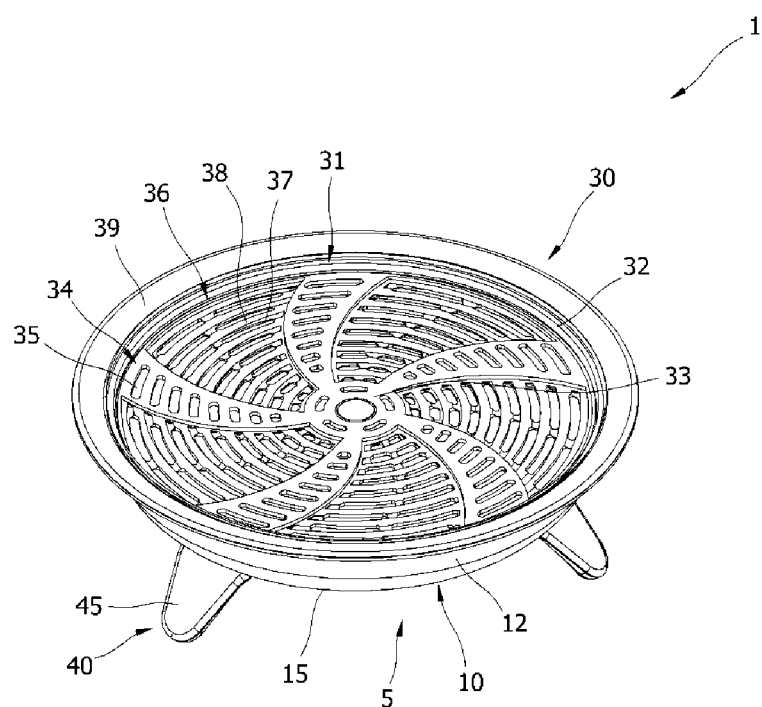
FIG. 18 is a perspective view of an exemplary cooking container for a cooking apparatus in accordance with a first embodiment of the present disclosure.
Figure 19:
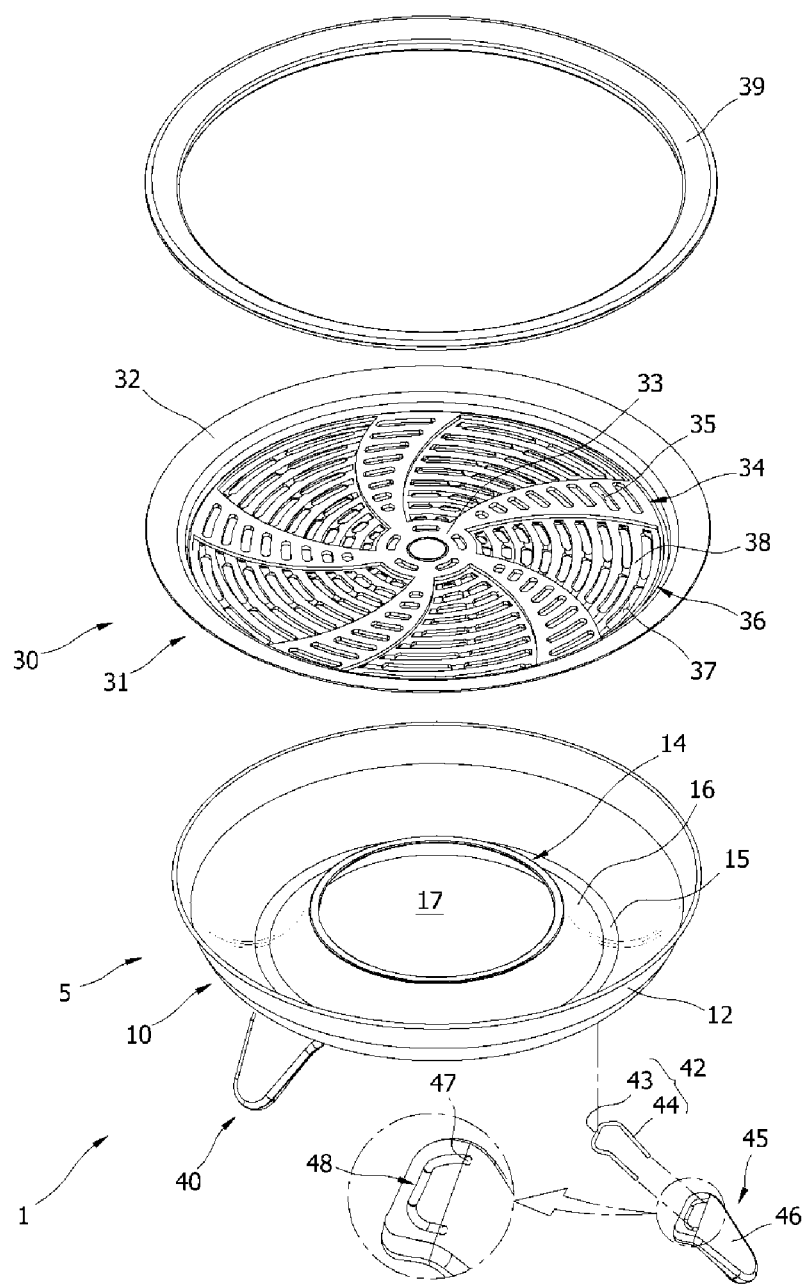
FIG. 19 is an exploded perspective view of the exemplary cooking container for a cooking apparatus in accordance with embodiment(s) of the present disclosure.
Figure 20:
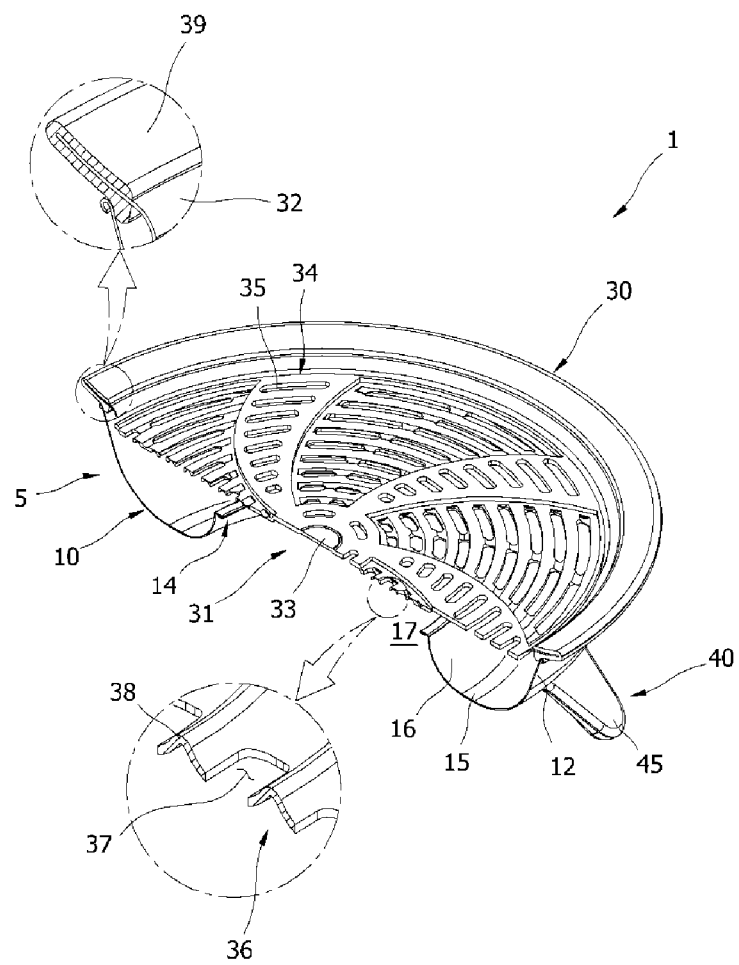
FIG. 20 is a cut-away perspective view of the exemplary cooking container for a cooking apparatus in accordance with embodiment(s) of the present disclosure.
Figure 21:
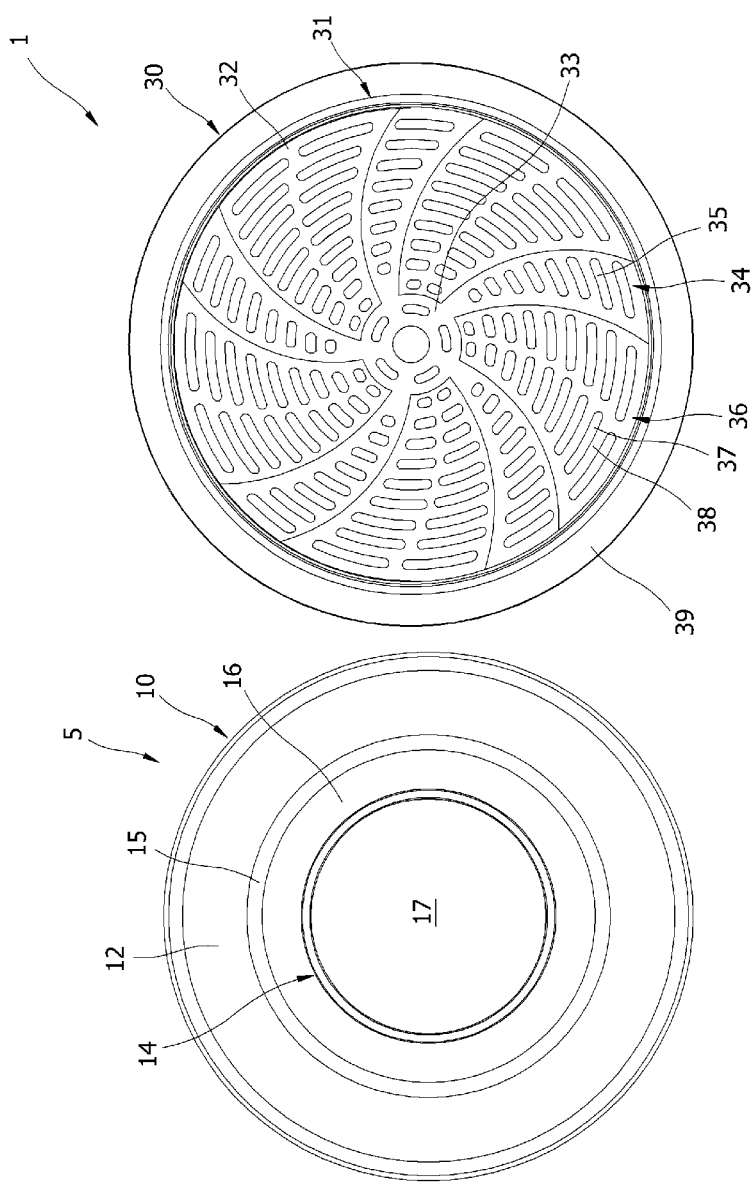
FIG. 21 is a plan view illustrating an exploded housing body and support unit in the exemplary cooking container for a cooking apparatus in accordance with embodiment(s) of the present disclosure.
Figure 22:
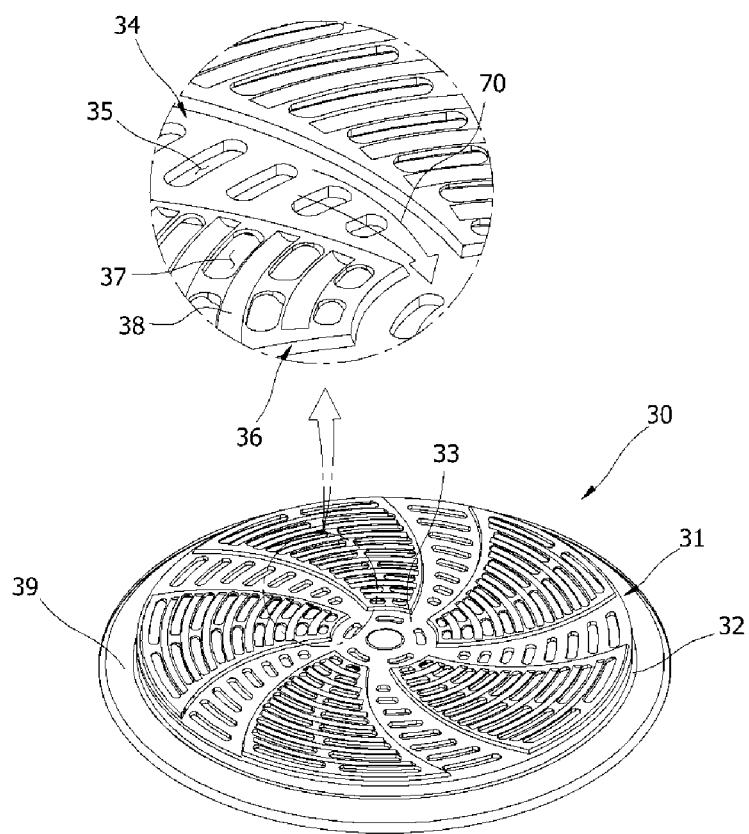
FIG. 22 is a perspective view illustrating the rear surface of the support unit in the exemplary cooking container for a cooking apparatus in accordance with embodiment(s) of the present disclosure.
Figure 23:
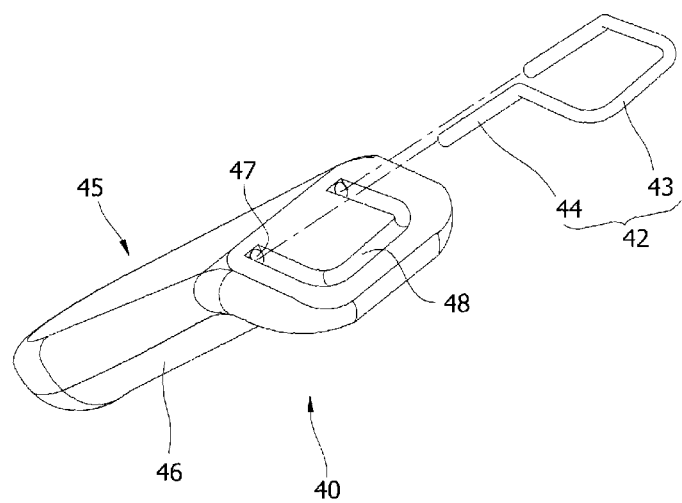
FIG. 23 is an exploded perspective view illustrating an exemplary leg for the exemplary cooking container in accordance with embodiment(s) of the present disclosure.
Figure 24:
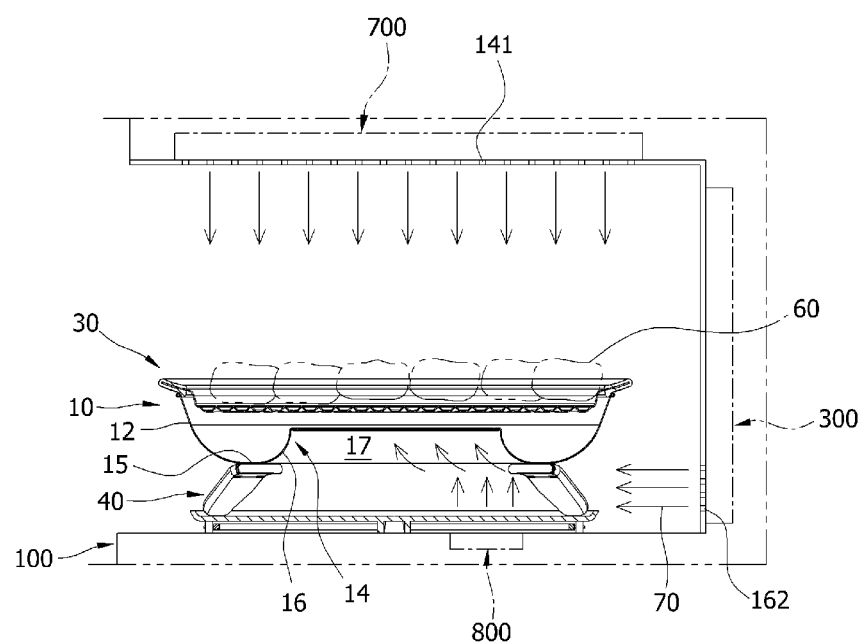
FIG. 24 is a view illustrating the exemplary cooking container in accordance with embodiment(s) of the present disclosure in a cooking apparatus during frying.
Figure 25:
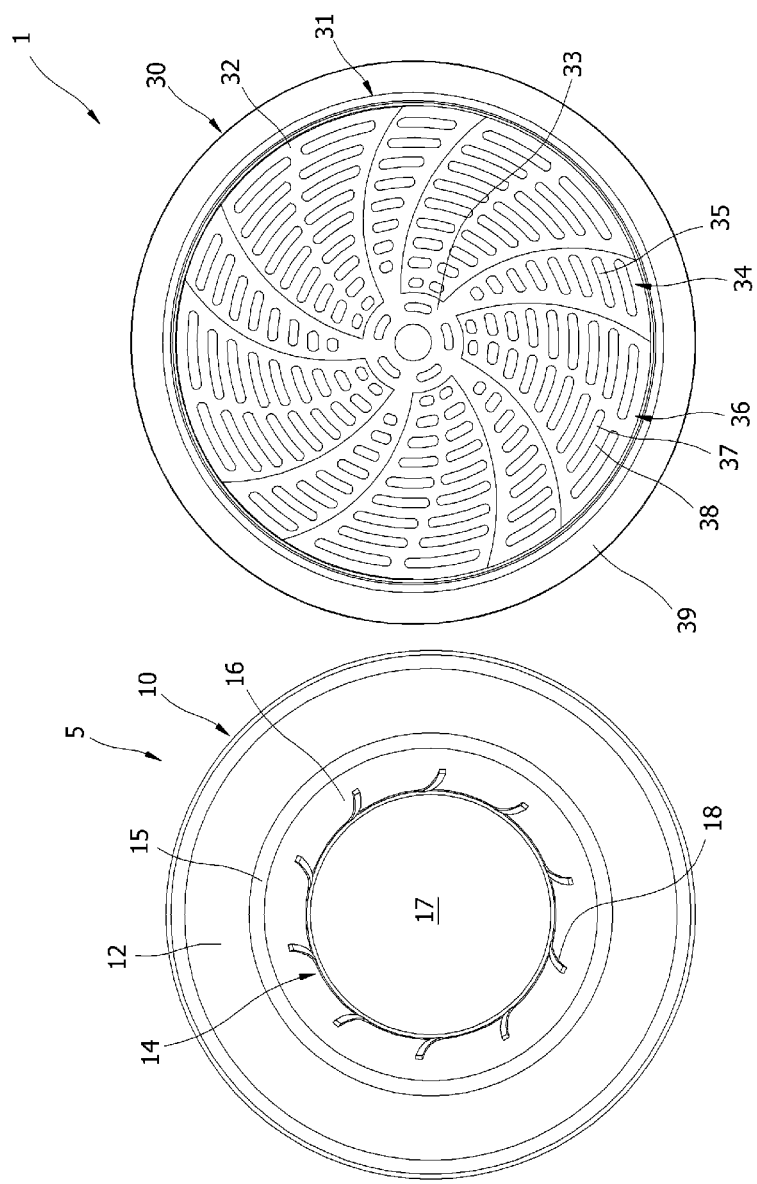
FIG. 25 is a plan view illustrating a variation of the housing body in an exemplary cooking container for a cooking apparatus in accordance with embodiment(s) of the present disclosure.
Figure 26:
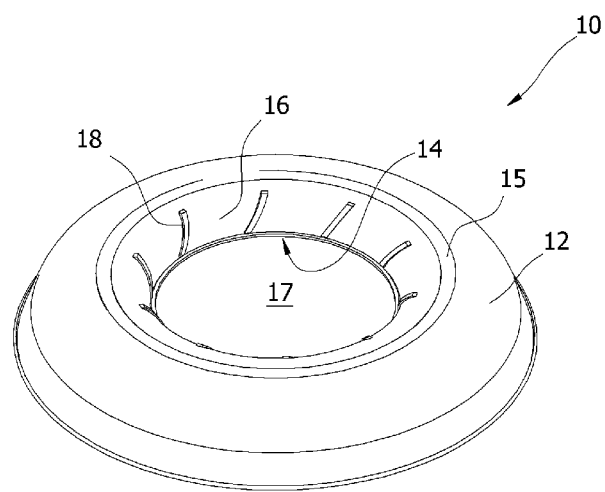
FIG. 26 is a perspective view illustrating the variation of the housing body of FIG. 25 in the exemplary cooking container for a cooking apparatus in accordance with embodiment(s) of the present disclosure.

FIG. 18 is a perspective view of an exemplary cooking container for a cooking apparatus in accordance with one or more embodiments of the present disclosure, FIG. 19 is an exploded perspective view of the exemplary cooking container in accordance with embodiment(s) of the present disclosure, and FIG. 20 is a cut-away perspective view of the exemplary cooking container in accordance with embodiment(s) of the present disclosure. FIG. 21 is a plan view illustrating an exploded housing body and support unit in the exemplary cooking container in accordance with embodiment(s) of the present disclosure, FIG. 22 is a perspective view illustrating the rear surface of the support unit in the exemplary cooking container for a cooking apparatus in accordance with embodiment(s) of the present disclosure, and FIG. 23 is an exploded perspective view illustrating a leg of the exemplary cooking container for a cooking apparatus in accordance with embodiment(s) of the present disclosure. FIG. 24 is a view illustrating the exemplary cooking container in a cooking apparatus in the frying mode in accordance with embodiment(s) of the present disclosure. FIG. 25 is a plan view illustrating a variation of the housing body in the exemplary cooking container in accordance with embodiment(s) of the present disclosure, and FIG. 26 is a perspective view illustrating the variation of the housing body in the exemplary cooking container in accordance with embodiment(s) of the present disclosure.

Referring to FIGS. 18, 19 and 24, a cooking container 1 for a cooking apparatus in accordance with one or more embodiments of the present disclosure includes a housing unit 5 which has an entrance 14 through which hot air 70 passes, and a support unit 30 on the housing unit 5 and on which one or more cooking objects 60 to be cooked by the hot air 70 is placed.

The cooking object(s) 60 are placed on the support unit 30, and the housing unit 5 is under the support unit 30. Since the housing unit 5 which supports the support unit 30 has a central entrance 14, the hot air 70 may enter the housing unit 5 through the entrance 14.

The housing unit 5 may have one or more of a variety of shapes without departing from a technical concept that it defines air flow paths for the hot air 70 supplied through the entrance 14 to heat the cooking object(s) 60 on the support unit 30.

Referring to FIGS. 19 to 21 and 24, the housing unit 5 in accordance with one or more embodiments of the present disclosure includes a housing body 10 with the entrance 14 at a lower portion and/or center thereof. The housing unit 5 is opened at the uppermost end or surface thereof, and further includes leg sections (legs) 40 which support the housing body 10.

The leg sections 40 which extend downward from the housing body 10 are placed on a rotation plate 270 or a bottom portion or lowermost horizontal surface of a cooking apparatus (e.g., in the cooking chamber).

The entrance 14 is at the lower portion or underside of the housing body 10, and the hot air 70 flowing from a side of the cooking container 1 (e.g., substantially at the level of the lower introduction hole section 162) enters the lower portion of the housing body 10 and flows toward the upper portion of the housing body 10.

A space under the housing body 10 exists because the housing body 10 is supported by the leg sections 40. As a result, the flow of air moving to the inside of the housing body 10 through the lower portion of the housing body 10 may be smoothly implemented.

The housing body 10 includes a housing side section 12, the entrance 14, a housing bottom section 15, a housing inside section 16, an introduction space 17, and optional guide projections 18.

The housing side section 12 supports the periphery of the support unit 30 and has a shape which extends downward. When viewed from the top, the housing side section 12 which forms the side surface of the housing body 10 has a circular or ring shape, and when viewed from the side, has a rounded contour or curved cross-section, which may be rounded from the uppermost end or surface to the lowermost end or surface of the housing side section 12.

Since the housing side section 12 has a rounded contour and curves inwardly towards the housing body 10 in a downward direction, the hot air 70 flowing from the side of the housing body 10 toward the housing side section 12 may be guided downward towards the underside of the housing side section 12, whereby the cooking time may be reduced or shortened.

That is, since the housing side section 12 is sloped and/or has a rounded shape, the hot air 70 supplied in a sideward direction towards the housing body 10 may be easily introduced into the housing body 10 through the entrance 14 at a lower portion or underside of the housing body 10, the amount of hot air 70 flowing into the entrance 14 may be increased, by which loss of hot air 70 may be reduced.

The housing bottom section 15 connected to and/or integral with the lowermost end or surface of the housing side section 12 extends inwardly from the lowermost end or surface of the housing side section 12. The housing bottom section 15 extends horizontally from the lowermost end or surface of the housing side section 12 and has an annular shape. The leg sections 40 are fixed to the lowermost surface of the housing bottom section 15.

Since the leg sections 40 are abutted on the housing bottom section 15 which extends horizontally, the contact area between the leg sections 40 and the housing bottom section 15 may be increased or maximized, by which fixing or securing the leg sections 40 to the housing body 10 may be stably implemented.

The housing inside section 16 which extends upward from the housing bottom section 15 defines, at the uppermost end or surface thereof, the entrance 14 through which the hot air 70 enters the cooking container 1. The introduction space 17 which communicates with the entrance 14 is in the housing inside section 16. The housing inside section 16 which defines the introduction space 17 has a convex curved shape.

Because the introduction space 17 is under the entrance 14, and the housing inside section 16 defining the introduction space 17 has a convex curved shape, the flow of hot air 70 through the housing inside section 16 to the entrance 14 may be stably implemented. Since the housing inside section 16 may have a funnel shape (or inverse funnel shape) which decreases with distance from the surface on which the cooking container 1 is placed, the hot air 70 which flows upward through the housing inside section 16 may smoothly enter the housing body 10 through the entrance 14.

The uppermost end or surface of the housing body 10 in accordance with various embodiments is at a position and/or height (e.g., a distance from the bottom wall 120 of the cooking chamber C) the same as or higher than the lower introduction hole section 162 through which the hot air 70 is discharged toward the side of the housing body 10. As a result, the hot air 70 may be easily supplied into the housing body 10 through the lower end or underside of the housing body 10.

The height of the holes that are at the upper end of the lower introduction hole section 162 may be the same as or lower than the height of the uppermost end or surface of the housing body 10. When the height of the lower introduction hole section 162 is less than or below the housing body 10, the hot air 70 flows to the entrance 14 through the lower end or underside of the housing body 10.

Since the hot air 70 flowing through the entrance 14 is hotter than the surrounding air, it moves upward (e.g., by convection). Therefore, the hot air 70 flowing towards the entrance 14 by inertia when discharged from the convection heater unit 300 flows toward the uppermost end or surface of the housing body 10 due to convection (e.g., natural movement upward), and heats the cooking object(s) 60.

The hot air 70 that does not flow upward through the entrance 14, but flows upward obliquely from the underside of the cooking container 1, comes into contact with the rounded surface of the housing inside section 16 and then flows upward toward the entrance 14. Accordingly, most of the hot air 70 supplied to the lower end or underside of the housing body 10 flows upward through the entrance 14.

When the height of the holes at the upper end of the lower introduction hole section 162 is the same as or lower than the height of the uppermost end or surface of the housing body 10, a downward flow of the hot air 70 is guided along the curved surface of the side of the housing body 10.

In other words, a portion of the hot air 70 that flows horizontally through the lower introduction hole section 162 flows to the entrance 14 through the lower end or underside of the housing body 10, and the remaining portion of the hot air 70 flows to the lowermost end or surface of the housing side section 12 along the curved surface of the housing side section 12 and joins to the hot air 70 that enters the entrance 14 from the lowermost end or surface of the housing side section 12.

The housing body 10 may comprise a steel or aluminum body (which may be integrated or a single piece), with an optional coating of a low-stick or non-stick material such as Teflon or polycarbonate thereon. Stainless steel may also be used for the housing body 10, optionally without a coating thereon.

If radiation heat and/or convection heat from an upper heater unit 700 is transferred to the inside of the housing body 10, since the radiation heat and/or convection heat reflected inside the housing body 10 moves toward the uppermost end or surface of the housing body 10, thermal efficiency may be improved.

Since the housing side section 12, the housing bottom section 15 and the housing inside section 16 may have a substantially U-shaped cross-section or a substantially J-shaped cross-section, an easy upward reflection of the heat from the upper heater unit 700 may be ensured, radiation heat directed downward from a higher position may be reflected toward the uppermost end or surface of the housing body 10.

FIGS. 25 and 26 show a variation of the housing body 10, in which separate guide projections 18 may be on the housing inside section 16 to guide the rotational movement of the hot air 70.

The guide projections 18, which may have a spiral or curved shape on the surface of the housing inside section 16 facing the introduction space 17, perform a guiding function, and the hot air 70 flowing toward the entrance 14 through the introduction space 17 may rotate as a result.

A plurality of guide projections 18 along the circumference of the housing inside section 16 in the introduction space 17 may extend upward from the lowermost end or surface of the housing inside section 16.

Since the guide projections 18, which project inward from the surface of the housing inside section 16, are each inclined and/or curved in the same direction, the hot air 70 passing through the housing inside section 16 is guided by the guide projections 18 and forms a vortex flow.

As the hot air 70 forming the vortex flow moves to the support unit 30 through the housing body 10, the time and area by and over which the cooking object(s) 60 on the support unit 30 and the hot air 70 come into contact with each other increase, and the cooking time may be reduced or shortened.

Referring to FIGS. 19 to 22, the support unit 30 on the housing unit 5 may have any of a variety of shapes without departing from the technical concept that it includes a plurality of through-holes and supports the cooking object(s) 60 to be cooked by the hot air 70.

The support unit 30 in accordance with various embodiment(s) includes a support body section 31 and a cover section 39. The support body section 31 may have any of a variety of shapes without departing from the technical concept that it includes the plurality of through-holes through which the hot air 70 flows, and the cover section 39 may have any of a variety of shapes without departing from the technical concept that it covers the outer periphery of the support body section 31.

The support body section 31 in accordance with various embodiment(s) includes a peripheral support part 32, a central support part 33, a plurality of first support parts 34, and a plurality of second support parts 36.

The peripheral support part 32 may have an annular shape. The cover section 39 covers the peripheral support part 32. The central support part 33, the first support parts 34 and the second support parts 36 are generally inside the peripheral support part 32.

The peripheral support part 32 covered by the cover section 39 may have a ring or annular shape, and may comprise or consist essentially of aluminum.

The central support part 33 is at the center portion of the support body section 31, inside the peripheral support part 32. The central support part 33 and the peripheral support part 32 are separate from each other.

The first support parts 34 and the second support parts 36 which extend from the central support part 33 are connected to the peripheral support part 32. Since the first support parts 34 and the second support parts 36 may be curved and/or have a spiral shape, they may guide the rotation of the hot air 70 which flows from the lowermost end or surface of the support unit 30 toward the uppermost end or surface of the support unit 30.

The first support parts 34 have first through-holes 35 through which the hot air 70 passes. The first support parts 34 extend from the central support part 33 to the peripheral support part 32, and may have a curved or spiral shape. The first through-holes 35 may have an oval or curved oval (e.g., "kidney") shape.

A plurality of first support parts 34 are along the circumference of the central support part 33, and the second support parts 36 are between adjacent first support parts 34.

The second support parts 36 have second through-holes 37 through which the hot air 70 passes, and extend like the first support parts 34. The second support parts 36 may have a curved or spiral shape. The second through-holes 37 may have an oval or curved oval (e.g., "kidney") shape.

The second support parts 36 may have a width that is at least two times the width of the first support parts 34. Cooking the cooking object(s) 60 is mainly carried out by and/or on the second support parts 36.

Since the uppermost surface of the second support parts 36 is below the first support parts 34, the hot air 70 moving from the lowermost end or surface of the support unit 30 toward the uppermost end or surface of the support unit 30 rotates along the lower surfaces of the first support parts 34 and forms a vortex flow.

Because the direction of the vortex flow formed as the hot air 70 passes the guide projections 18 of the housing unit 5 is the same as the vortex flow formed as the hot air 70 moves along the lower surfaces of the first support parts 34, the hot air 70 forms a vortex flow inside the housing unit 5, and the contact time of the hot air 70 with the cooking object(s) 60 increases.

The first through-holes 35 in the first support parts 34 and the second through-holes 37 in the second support parts 36 extend in a circumferential direction.

The first through-holes 35 and the second through-holes 37 may form arcs centered on the central support part 33. A plurality of first through-holes 35 and a plurality of second through-holes 37 are between the central support part 33 and the peripheral support part 32.

The second support parts 36 include rounded support portions 38 having an arc-like shape and a convex upward cross-section, although the second support parts 36 are not limited to such a configuration. The arc(s) of the second support parts 36 are generally centered on the central support part 33.

The rounded support portions 38 may have an upwardly convex shape, and the lowermost surface of the rounded support portions 38 may be concave. Thus, juice or other liquid(s) coming out from the cooking object(s) 60 on the rounded support portions 38 flows downward on the rounded support portions 38 and optionally into the body 10. As a result, cleaning the surface(s) of the second support parts 36 may be relatively easy or convenient to perform.

Further, since the hot air 70 supplied to the lower portions of the rounded support portions 38 may stay in the concave grooves of the rounded support portions 38, the contact time of the hot air 70 with the rounded support portions 38 increases, and heating the rounded support portions 38 may be easily implemented, whereby the cooking time for the cooking object(s) 60 may be reduced or shortened.

The cover section 39 covering the peripheral support part 32 may comprise rubber and/or silicon. Thus, it is possible to prevent sparks from occurring at the periphery of the support unit 30 while the support unit 30 is placed in a microwave oven.

The support unit 30 in accordance with one or more embodiment(s) may comprise aluminum coated with Teflon or other low-stick or non-stick material. Since aluminum has high heat conductivity, heating the cooking object(s) 60 may be quickly implemented, and the coating may prevent adhesion of the cooking object(s) 60 to the support unit 30.

Since the cover section 39 may include silicone, it is generally between the support unit 30 (which may comprise aluminum) and the housing body 10 (which may comprise a steel plate), and can prevent the occurrence of a spark.

Referring to FIGS. 19 to 23, each of the leg sections 40 includes a leg frame 42 fixed to the outer surface of the housing unit 5, and a leg cover 45 which surrounds and receives the leg frame 42. The leg frame 42 may comprise a shaped wire.

The leg frame 42 may comprise a steel structure, and the leg cover 45 surrounding and receiving the leg frame 42 may comprise silicone.

The leg frame 42 in accordance with one or more embodiment(s) includes a fixing part 43 fixed to the lower portion of the housing unit 5, and extending parts 44 which extend downward from ends of the fixing part 43.

Since the leg cover 45 is coupled to the extending parts 44 which outwardly slope and extend downward from the lower portion of the housing unit 5, the leg cover 45 is fixed to the outer surfaces of the extending parts 44.

The leg cover 45 in accordance with one or more embodiment(s) of the present disclosure includes a cover body 46 which has mounting grooves or holes 47 into which the extending parts 44 are inserted, and a shielding part 48 comprising a groove in the cover body 46 configured to shield the fixing part 43.

The mounting grooves or holes 47 extend into the cover body 46, and the shielding part 48 which may at least partially conform to the contour of the fixing part 43 is in one end of the cover body 46.

Because the extending parts 44 are inserted into the mounting grooves or holes 47, and the fixing part 43 is received in the shielding part 48, the leg frame 42 is shielded by the leg cover 45, by which the occurrence of a spark may be prevented.

Referring to FIGS. 18 and 24, the cooking container 1 is rotated by the rotation plate 270 of the cooking apparatus. Thus, it is possible to uniformly heat the cooking object(s) 60.

The cooking apparatus may provide radiation heat and/or convection heat using the convection heater unit 300, the upper heater unit 700 and a lower heater unit 800. In particular, since each of the respective heater units 300, 700 and 800 has a fan for moving or circulating hot air, the hot air 70 may be smoothly supplied to the cooking container 1.

The hot air produced from the upper heater unit 700 is supplied to the upper part of the cooking container 1, the hot air 70 produced from the convection heater unit 300 moves to the lower end or underside of the cooking container 1 and enters the inside of the housing unit 5. The hot air produced from the lower heater unit 800 enters the inside of the housing unit 5 through the lower end or underside of the cooking container 1.

Hereinafter, operations of the cooking container 1 for a cooking apparatus in accordance with one or more embodiment(s) of the present disclosure will be described in detail.

After placing the cooking container 1 in the cooking apparatus, the convection heater unit 300, the upper heater unit 700 and the lower heater unit 800 are operated.

As the upper heater unit 700 is operated, heat is transferred downward toward the support unit 30. The heat that moves below the support unit 30 after heating the cooking object(s) 60 is reflected inside the housing body 10 and may move upwards. Since the hot air reflected by the housing body 10 is transferred to the lowermost end or surface of the support unit 30 and may provide secondary heat to the cooking object(s) 60, the cooking time may be reduced or shortened.

The hot air 70 produced from the convection heater unit 300 moves to the side of the housing body 10 or the lower end or underside of the housing body 10. The hot air 70 guided to the lower end or underside of the housing body 10 on the housing side section 12 flows to the introduction space 17 in the housing inside section 16. Similarly, the hot air produced from the lower heater unit 800 is guided to the lower end or underside of the housing body 10 and flows into the introduction space 17.

The hot air 70 that moves upward through the housing inside section 16 rotates and/or is guided by the guide projections 18 in the housing inside section 16, and may create a vortex flow.

Since the hot air 70 entering the housing body 10 creates the vortex flow while rotating on and/or contacting the lower surfaces of the first support parts 34 in the support unit 30, the contact time of the support body section 31 and the cooking object(s) 60 with the hot air 70 increases, whereby thermal efficiency may improve and the cooking time of the cooking object(s) 60 may be reduced or shortened.

Furthermore, as the hot air 70 moving upward from the lowermost end or surface of the support unit 30 toward the uppermost end or surface of the support unit 30 may stay in the concave grooves of the rounded support portions 38 in the second support parts 36, the contact time of the hot air 70 and the support body section 31 may increase, by which heating of the support body section 31 may be easily implemented.

Hereafter, a cooking container for a cooking apparatus in accordance with one or more further embodiments of the present disclosure will be described with reference to drawings. For the sake of convenience in explanations, the same reference numerals will be used to refer to components and/or elements with the same construction(s) and/or function(s) as other embodiment(s) of the present disclosure, and detailed descriptions thereof will be omitted.

Figure 27:
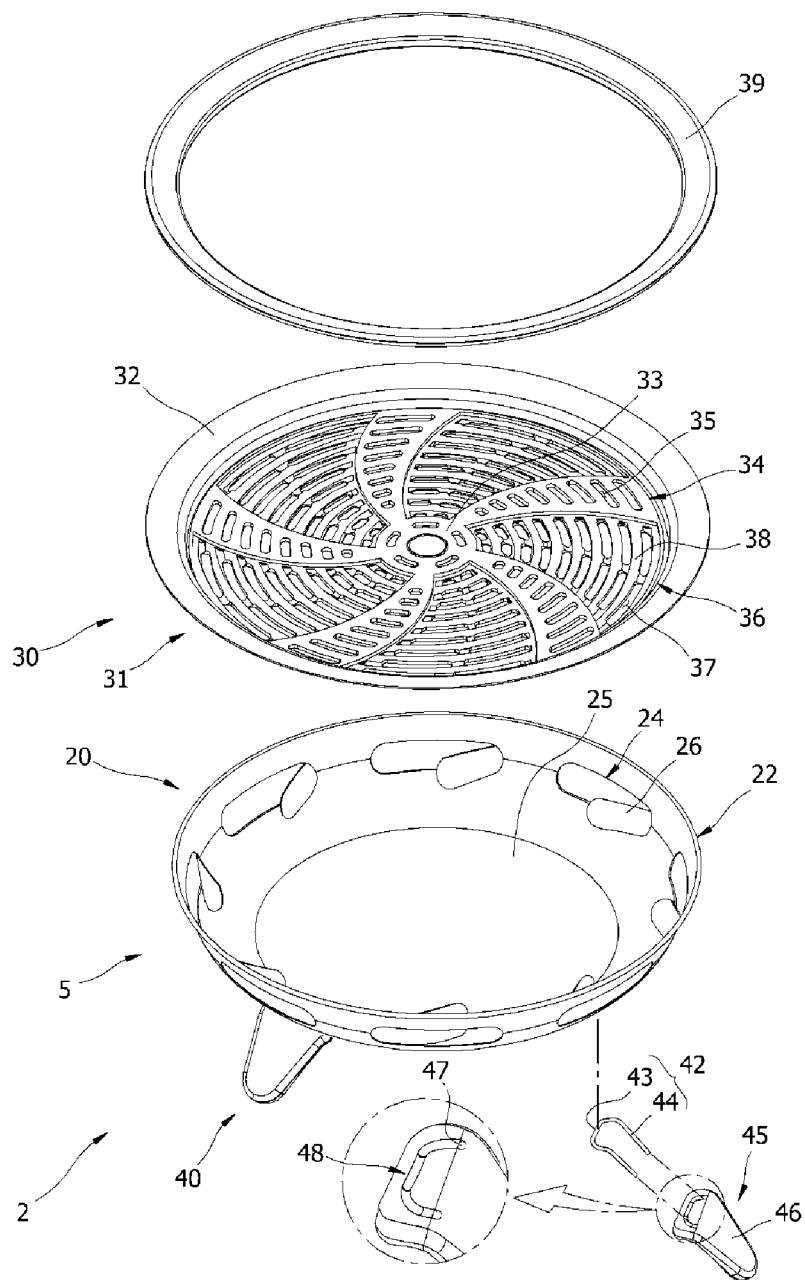
FIG. 27 is an exploded perspective view of an exemplary cooking container for a cooking apparatus in accordance with one or more embodiments of the present disclosure.
Figure 28:
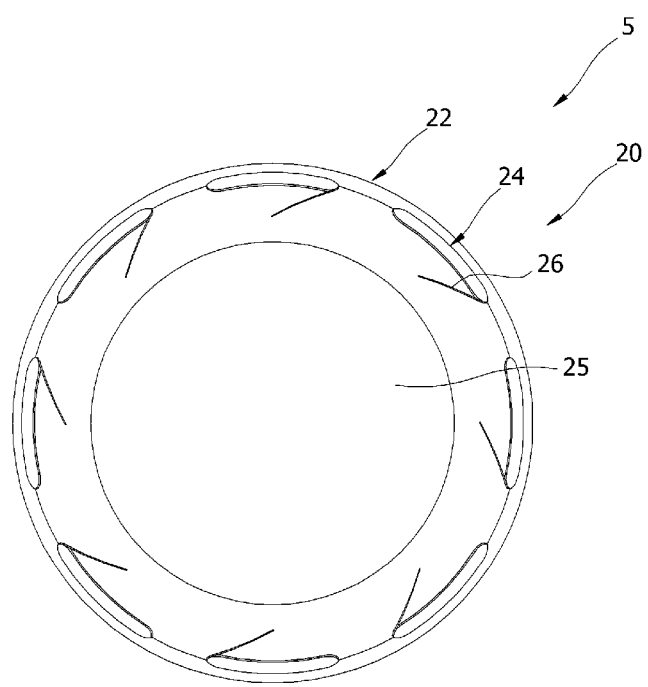
FIG. 28 is a plan view illustrating a housing body in the exemplary cooking container for a cooking apparatus in accordance with embodiment(s) of the present disclosure.
Figure 29:
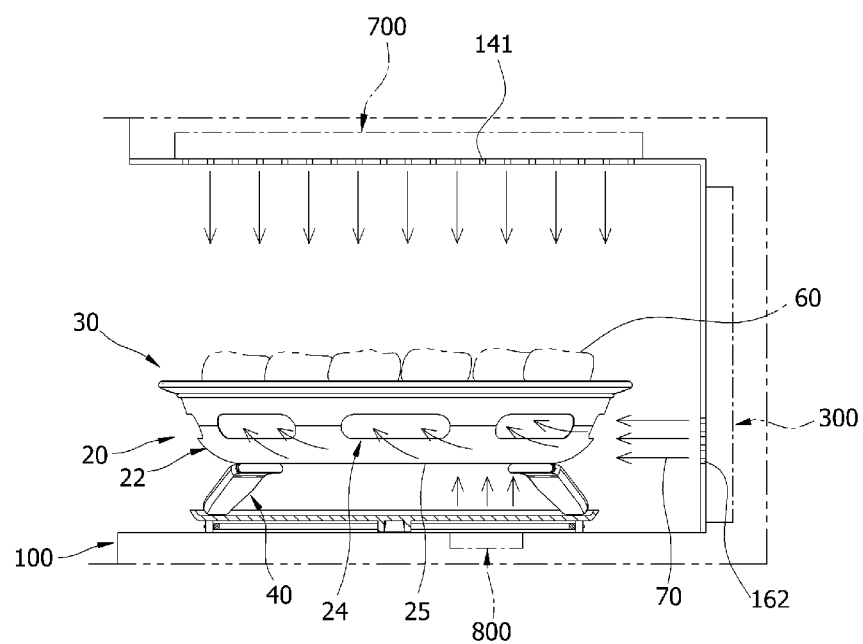
FIG. 29 is a view illustrating an exemplary cooking container in a cooking apparatus in accordance with one or more embodiments of the present disclosure during frying.

FIG. 27 is an exploded perspective view of an exemplary cooking container for a cooking apparatus in accordance with one or more embodiments of the present disclosure, FIG. 28 is a plan view illustrating a housing body for the exemplary cooking container in accordance with embodiment(s) of the present disclosure, and FIG. 29 is a view illustrating the exemplary cooking container in accordance with embodiment(s) of the present disclosure in a cooking apparatus in a frying mode.

Referring to FIGS. 27 to 29, the housing unit 5 in accordance with one or more other embodiments of the present disclosure includes a housing body 20 and leg sections 40.

Entrances 24 configured to supply hot air 70 to the inside of the housing body 20 are along the side surface of the housing body 20. The uppermost end or surface of the housing body 20 is open, and the lower end or underside of the housing body 20 is supported by the leg sections 40.

The housing body 20 in accordance with one or more embodiment(s) of the present disclosure includes a housing side section 22, a housing bottom section 25, and inner guides 26.

The housing side section 22 forms an outside surface of the housing body 20 and supports the periphery of the support unit 30. The housing side section 22 may have a ring or annular shape which extends downward.

The entrances 24 along the circumference of the housing side section 22 form passages through which the hot air 70 moves to the inside of the housing body 20. The entrances 24 may comprise slots or openings which extend horizontally. A plurality of entrances 24 are along the housing side section 22.

The housing bottom section 25 is secured to or integral with the lowermost end or surface of the housing side section 22 forms the bottom of the housing body 20.

Since the upper ends or uppermost boundaries of the entrances 24 have the same height as or a lower height than the height of the upper end of the lower introduction hole section 162 from which the hot air 70 is discharged towards the side of the housing body 20, the hot air 70 may easily enter the entrances 24.

A portion of the hot air 70 from the lower introduction hole section 162 moves to the inside of the housing body 20 through the entrances 24 in the side surface of the housing side section 22, and the hot air 70 above the entrances 24 flows downwardly along the curved or sloped surface of the housing side section 22 and enters the entrances 24. As a consequence, the heating time of the cooking object(s) 60 by the hot air 70 may be reduced or shortened.

The inner guides 26 are connected to the inner surface of the housing side section 22, and project into the housing side section 22. The inner guides 26 may have any of a variety of shapes without departing from the technical concept that they guide the movement of the hot air 70 that enters the entrances 24.

The inner guides 26 in accordance with one or more embodiment(s) of the present disclosure project toward the inside of the housing side section 22 from one end of the entrance 24 in a horizontal direction and/or at an angle facilitating formation of a vortex flow of the hot air 70 inside the housing body 20.

The hot air 70 entering the entrances 24 is guided by the inner guides 26 and forms a vortex flow. As a result, the contact area and contact time of the hot air 70 and the cooking object(s) 60 with each other increase.

Hereinafter, operations of the exemplary cooking container 2 for a cooking apparatus in accordance with one or more embodiment(s) of the present disclosure will be described in detail.

The hot air 70 produced from the convection heater unit 300 moves toward the side of the housing body 20, and some of the hot air 70 at the housing side section 22 moves to the inside of the housing body 20 through the entrances 24.

The hot air 70 in the housing body 20 rotates inside the housing body 20, and its movement is guided by the inner guides 26.

Since the hot air 70 creates a vortex that flows inside of the housing body 20 and rotates on the surfaces of the first support parts 34 in the support unit 30, the contact time of the support body section 31 and the cooking object(s) 60 with the hot air 70 increases, whereby thermal efficiency may be improved and the cooking time of the cooking object(s) 60 may be reduced or shortened.

Furthermore, as the hot air 70 moving upward from the lowermost end or surface of the support unit 30 toward the uppermost end or surface of the support unit 30 stays for at least some time in the concave grooves of the rounded support portions 38 in the second support parts 36, the contact time of the hot air 70 with the support body section 31 increases, by which heating of the support body section 31 may be easily implemented. Meanwhile, the heat and/or hot air from the upper heater unit 700 and the lower heater unit 800 heat(s) the cooking object(s) 60 in the same manner as in other embodiments.

By the above-described constructions, since the cooking containers 1 and 2 in accordance with various embodiments carry out frying by heating the cooking object(s) 60 on the support unit 30 with the hot air 70, it is possible to decrease the likelihood of a safety-related accident to occur due to use of oil, improve the nutritional and/or health benefits of the cooked food, and reduce the cooking cost.

Also, since the hot air 70 entering the inside of the housing unit 5 heats the cooking object(s) 60 while rotating in a spiral pattern, the contact time of the hot air 70 with the cooking object(s) 60 increases, whereby it is possible to shorten or reduce the cooking time.

Further, since the rounded support portions 38 which support the cooking object(s) 60 have a convex upward shape, the contact area between the cooking object(s) 60 and the support unit 30 is decreased, and a contact area over which the hot air 70 and the cooking object(s) 60 come into contact with each other is increased, whereby it is possible to shorten or reduce the cooking time.

Hereinafter, a cooking container for a cooking apparatus in accordance with one or more further embodiments of the present disclosure will be described with reference to drawings. For the sake of convenience in explanations, the same reference numerals will be used to refer to component elements with the same constructions and functions as other embodiment(s) of the present disclosure, and detailed descriptions thereof will be omitted.

Figure 30:
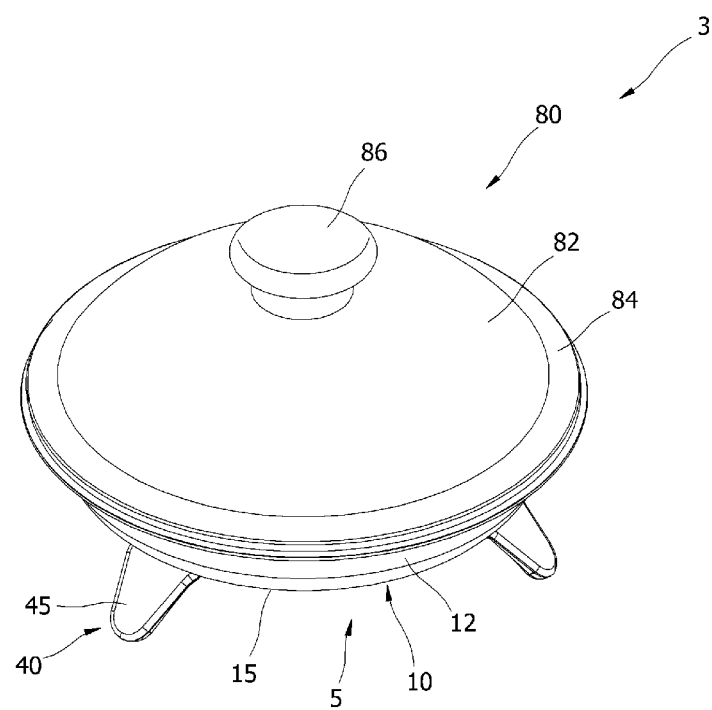
FIG. 30 is a perspective view of an exemplary cooking container for a cooking apparatus in accordance with one or more embodiments of the present disclosure.
Figure 31:
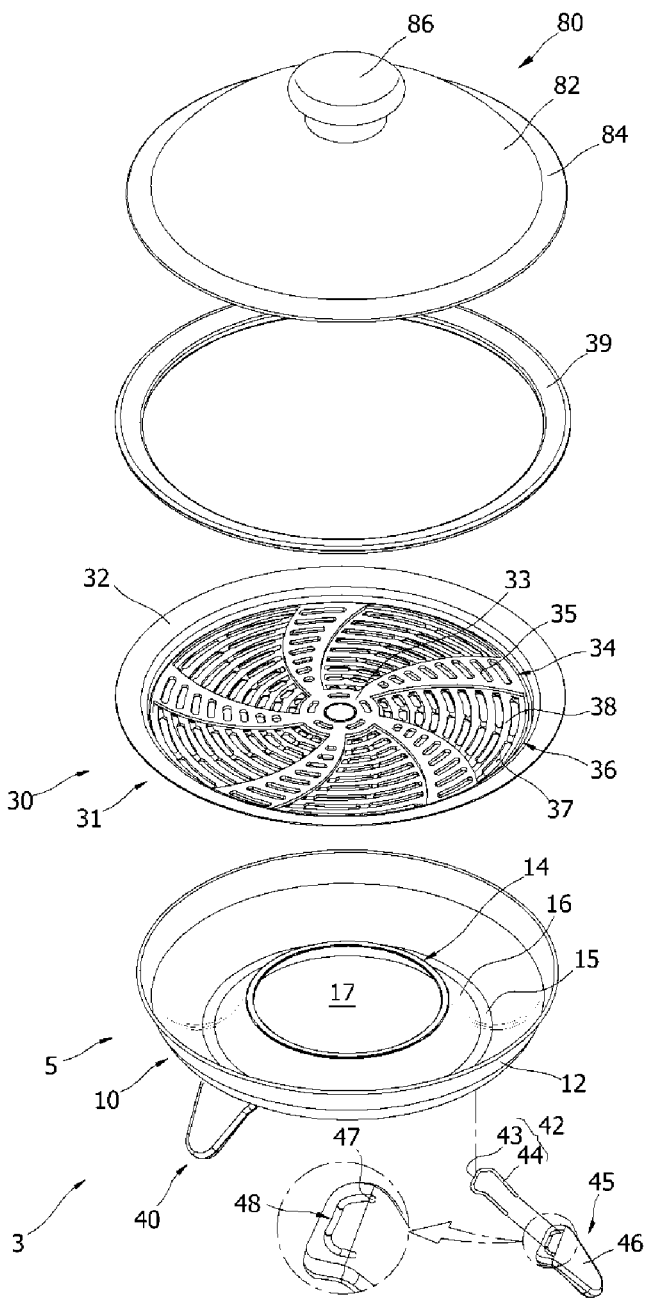
FIG. 31 is an exploded perspective view of the cooking container for a cooking apparatus in accordance with embodiment(s) of the present disclosure.
Figure 32:
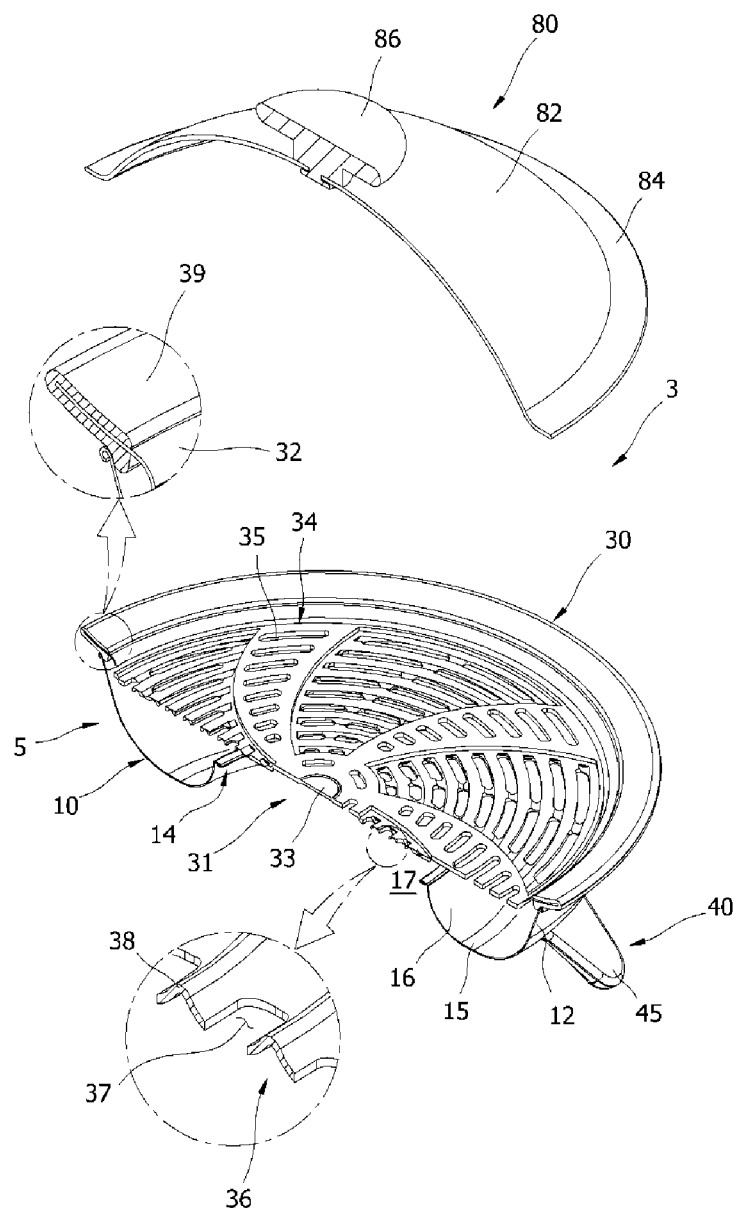
FIG. 32 is a cut-away perspective view of the cooking container for a cooking apparatus in accordance with embodiment(s) of the present disclosure.
Figure 33:
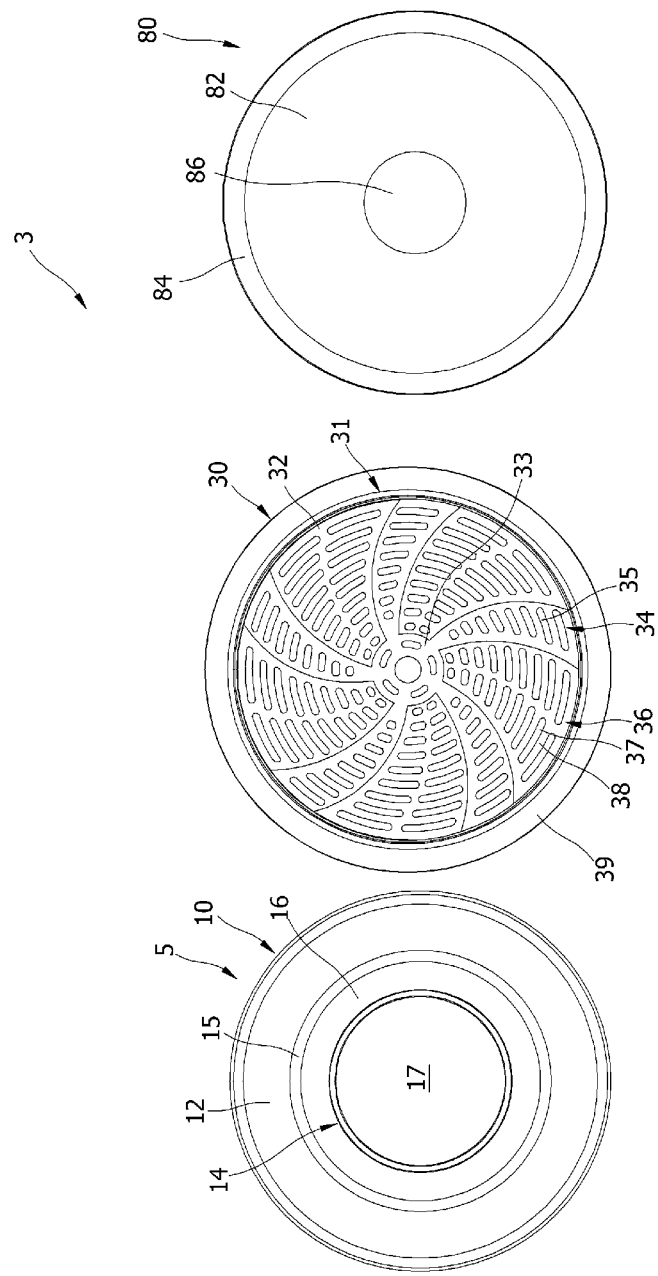
FIG. 33 is a plan view illustrating an exploded cooking container for a cooking apparatus in accordance with embodiment(s) of the present disclosure.
Figure 34:
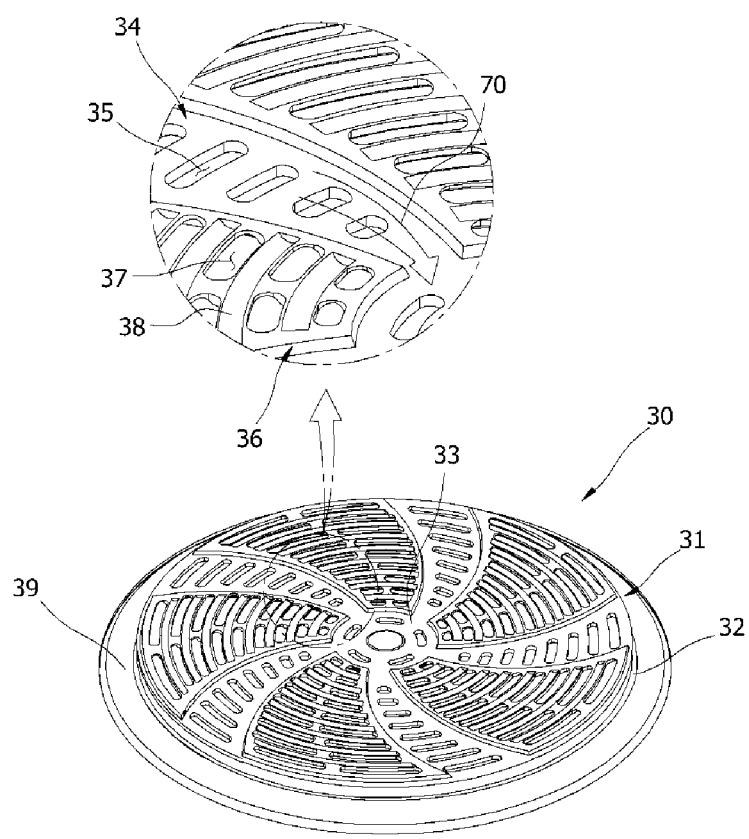
FIG. 34 is a perspective view illustrating the rear surface of a support unit in the exemplary cooking container for a cooking apparatus in accordance with embodiment(s) of the present disclosure.
Figure 35:
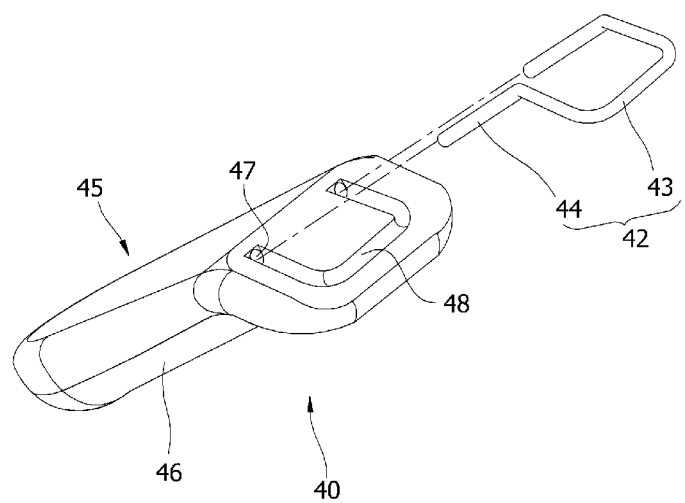
FIG. 35 is an exploded perspective view illustrating an exemplary leg for the cooking container in accordance with embodiment(s) of the present disclosure.
Figure 36:
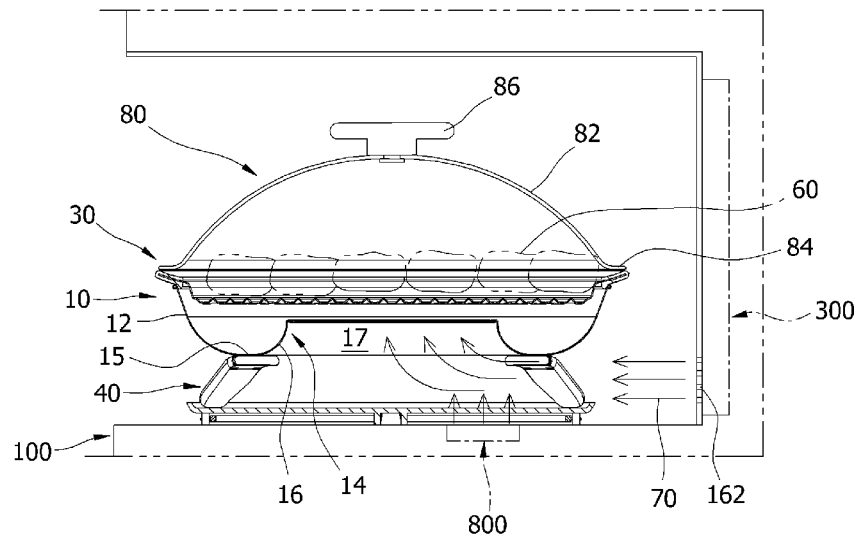
FIG. 36 is a view illustrating an exemplary cooking container in a cooking apparatus in accordance with one or more embodiments of the present disclosure during frying.
Figure 37:
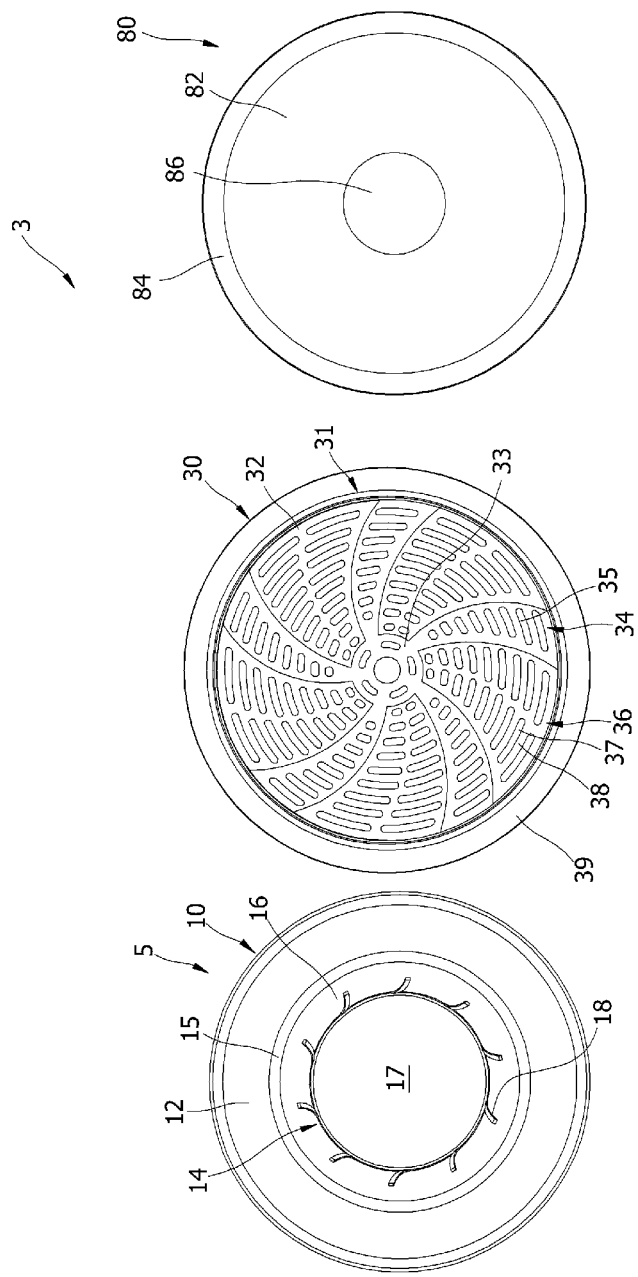
FIG. 37 is a plan view illustrating a variation of a housing body in the exemplary cooking container for a cooking apparatus in accordance with embodiment(s) of the present disclosure.
Figure 38:
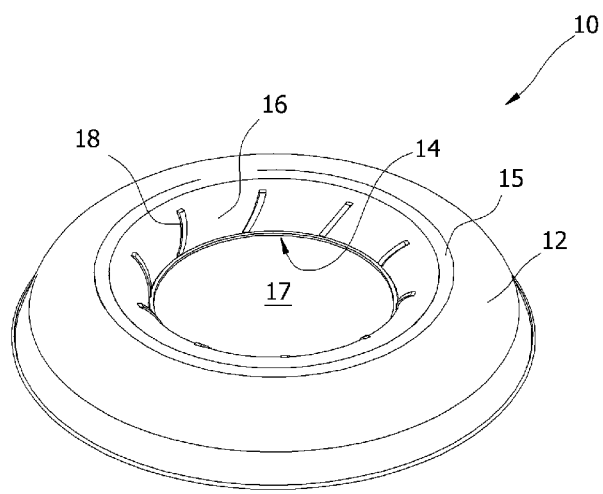
FIG. 38 is a perspective view illustrating the variation of the housing body of FIG. 37 in the exemplary cooking container for a cooking apparatus in accordance with embodiment(s) of the present disclosure.

FIG. 30 is a perspective view of an exemplary cooking container for a cooking apparatus in accordance with one or more embodiments of the present disclosure, FIG. 31 is an exploded perspective view of the exemplary cooking container in accordance with embodiment(s) of the present disclosure, and FIG. 32 is a cut-away perspective view of the exemplary cooking container in accordance with embodiment(s) of the present disclosure. FIG. 33 is a plan view illustrating an exploded cooking container for an exemplary cooking apparatus in accordance with embodiment(s) of the present disclosure, FIG. 34 is a perspective view illustrating the rear surface of a support unit in the exemplary cooking container in accordance with embodiment(s) of the present disclosure, and FIG. 35 is an exploded perspective view illustrating a leg section in the exemplary cooking container for a cooking apparatus in accordance with embodiment(s) of the present disclosure. FIG. 36 is a view illustrating the exemplary cooking container in accordance with embodiment(s) of the present disclosure in a cooking apparatus in a frying mode. FIG. 37 is a plan view illustrating a variation of a housing body in the exemplary cooking container for a cooking apparatus in accordance with embodiment(s) of the present disclosure, and FIG. 38 is a perspective view illustrating the variation of the housing body in the exemplary cooking container in accordance with embodiment(s) of the present disclosure.

Referring to FIGS. 30, 31 and 36, an exemplary cooking container 3 for a cooking apparatus in accordance with one or more embodiments of the present disclosure includes a housing unit 5 which has an entrance 14 through which hot air 70 enters, and a support unit 30 on the housing unit 5 and on which one or more cooking objects 60 to be cooked by the hot air 70 are placed.

The cooking object(s) 60 are placed on the support unit 30, and the housing unit 5 is under the support unit 30. Since the housing unit 5 supports the support unit 30 and has an entrance 14, hot air 70 may enter the housing unit 5 through the entrance 14.

The housing unit 5 may have one or more of a variety of shapes without departing from a technical concept that it defines air flow paths for the hot air 70 supplied through the entrance 14 to heat the cooking object(s) 60 on the support unit 30.

Referring to FIGS. 31 to 33 and 36, the cooking container 3 for a cooking apparatus in accordance with embodiment(s) of the present disclosure includes the housing unit 5 which has the entrance 14 through which the hot air 70 enters, the support unit 30 on the housing unit 5 and on which the cooking object(s) 60 to be cooked by the hot air 70 are placed, and a cover unit 80 which covers the support unit 30 and/or blocks the movement of the hot air 70. Namely, the exemplary cooking container 3 in accordance with embodiment(s) of the present disclosure further includes the cover unit 80 in addition to the exemplary cooking container 1 in accordance with other embodiment(s).

The cover unit 80 includes a cover body section 82 which closes the uppermost end or surface of the support unit 30, and a knob member 86 which projects upward from the cover body section 82.

The cover body section 82 may have a dome-like or spherical cap shape. The cover body section 82 covers the support unit 30, and may restrict or restrain the movement of the hot air 70 that might otherwise move outside of the cooking container 3. Also, since the cover body section 82 defines therein a space in which the hot air 70 may stay, the heating time for cooking the cooking object(s) 60 may be reduced or shortened.

A junction member 84 configured to be brought into contact with the periphery of the support unit 30 and that may comprise an elastic material is on the periphery of the cover body section 82. The junction member 84 facilitates effective restriction and/or restraint of the movement of the hot air 70 within the cover body section 82.

The junction member 84 may have an annular or ring shape that projects outward from the periphery of the cover body 82. The lower surface of the junction member 84 comes into contact with the cover section 39 of the support unit 30, and may improve airtightness.

Referring to FIGS. 30 to 34, the cover unit 80 may have any of a variety of shapes without departing from the technical concept that it restricts or restrains the movement of the hot air 70 which might otherwise move upwardly from the support unit 30.

Hereinafter, operations of the exemplary cooking container 3 for a cooking apparatus in accordance with embodiment(s) of the present disclosure will be described in detail.

After placing the cooking container 3 in the cooking apparatus, the convection heater unit 300 is operated. The hot air 70 produced from the convection heater unit 300 moves toward the side of the housing body 10 or to the lower end or underside of the housing body 10. The hot air 70 at the lower end or underside of the housing body 10 on the housing side section 12 flows to the introduction space 17 defined by the housing inside section 16. The hot air 70 moves upward through the housing inside section 16, and at least some part is rotated by the guide projections 18 on the housing inside section 16 to create a vortex flow.

Since the hot air 70 entering the inside of the housing body 10 creates a vortex flow while rotating on the lower surfaces of the first support parts 34 in the support unit 30, the contact time of the support body section 31 and the cooking object(s) 60 with the hot air 70 is increased, whereby thermal efficiency may be improved and the cooking time of the cooking object(s) 60 may be reduced or shortened.

Furthermore, as the hot air 70 moving upward from the lowermost end or surface of the support unit 30 toward the uppermost end or surface of the support unit 30 may stay in the concave grooves of the rounded support portions 38 in the second support parts 36, the contact time of the hot air 70 with the support body section 31 is increased, by which heating of the support body section 31 may be easily implemented.

Meanwhile, the hot air 70 moving up from the support unit 30 after heating the cooking object(s) 60 is reflected on the inner surface of the cover unit 80, then moves back down toward the support unit 30, and secondarily heats the cooking object(s) 60, whereby the cooking time may be reduced or shortened.

Since the hot air 70 having moved upward after heating the cooking object(s) 60 stays inside the cover unit 80 and raises the temperature inside of the cover unit 80, the cooking time of the cooking object(s) 60 below the cover unit 80 may be reduced or shortened.

Hereafter, an exemplary cooking container for a cooking apparatus in accordance with one or more further embodiments of the present disclosure will be described with reference to drawings. For the sake of convenience in explanations, the same reference numerals will be used to refer to components and/or elements with the same construction(s) and/or function(s) as other embodiments of the present disclosure, and detailed descriptions thereof will be omitted.

Figure 39:
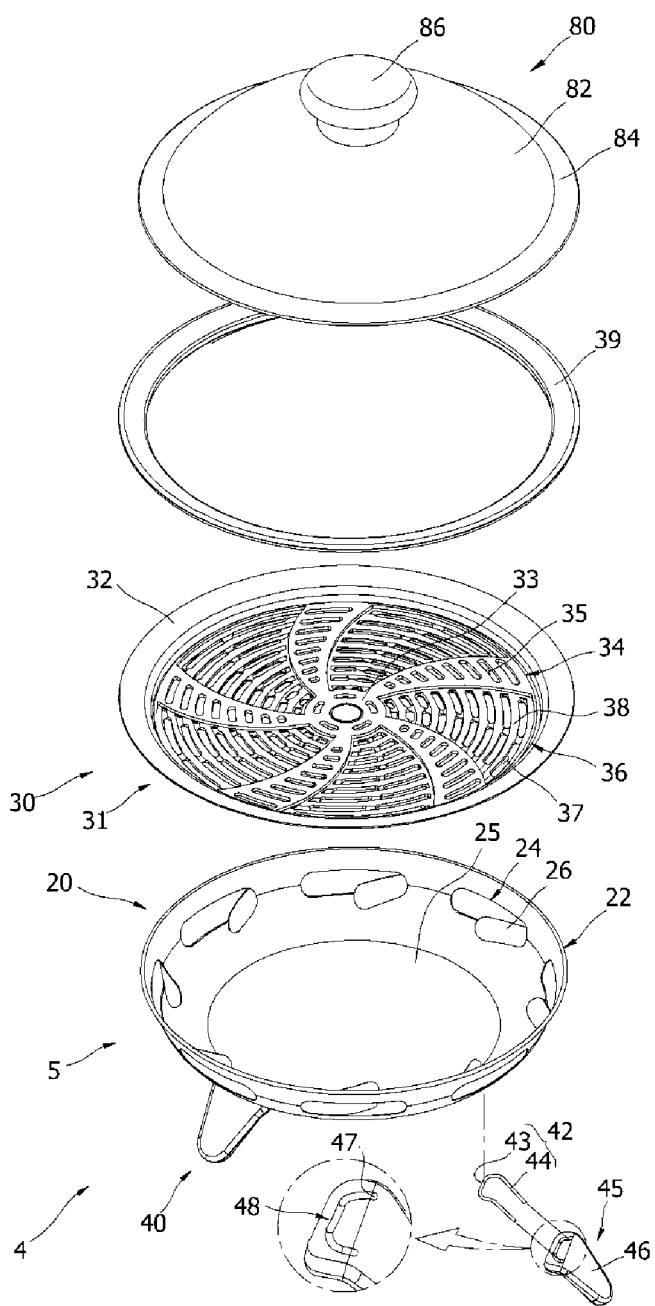
FIG. 39 is an exploded perspective view of a cooking container for a cooking apparatus in accordance with one or more embodiments of the present disclosure.
Figure 40:
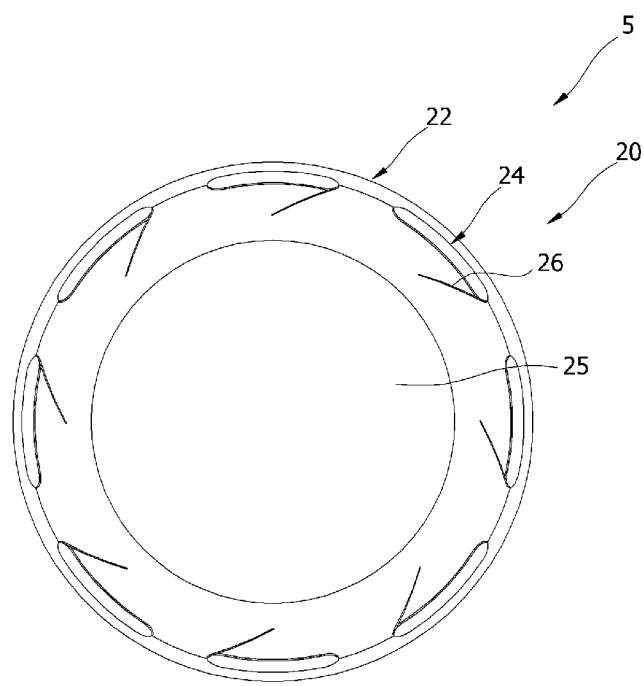
FIG. 40 is a plan view illustrating a housing body in the cooking container for a cooking apparatus in accordance with embodiment(s) of the present disclosure.
Figure 41:
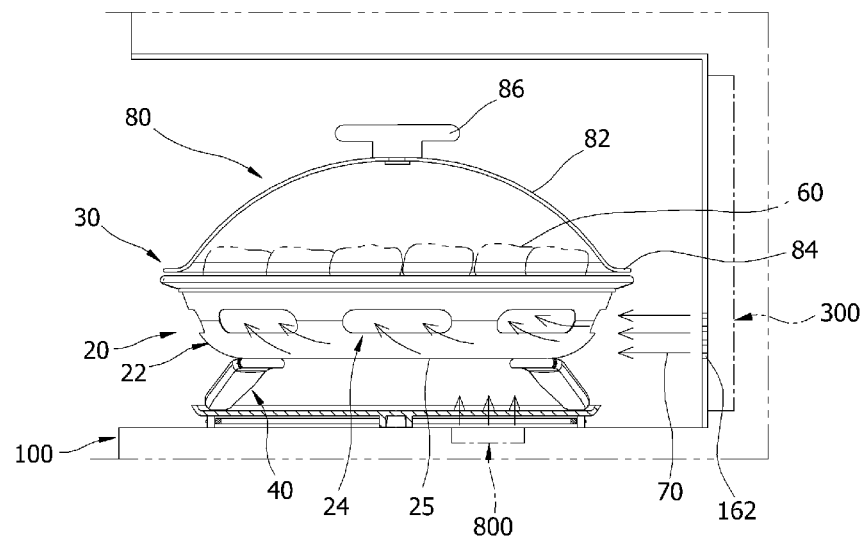
FIG. 41 is a view illustrating an exemplary cooking container in a cooking apparatus in accordance with one or more embodiments of the present disclosure during frying.

FIG. 39 is an exploded perspective view of an exemplary cooking container for a cooking apparatus in accordance with embodiment(s) of the present disclosure, FIG. 40 is a plan view illustrating a housing body in the exemplary cooking container in accordance with embodiment(s) of the present disclosure, and FIG. 41 is a view illustrating the exemplary cooking container in accordance with one or more further embodiments of the present disclosure in a cooking apparatus in which frying is performed.

Referring to FIGS. 39 to 41, an exemplary cooking container 4 for a cooking apparatus in accordance with embodiment(s) of the present disclosure further includes a cover unit 80 in addition to the exemplary cooking container 2 in accordance with other embodiment(s). The housing unit 5 of the cooking container 4 includes a housing body 20 and leg sections 40.

Entrances 24 configured to supply hot air 70 to the inside of the housing body 20 are along the side surface of the housing body 20. The uppermost end or surface of the housing body 20 is open, and the lower end or underside of the housing body 20 is supported by the leg sections 40.

The housing body 20 in accordance with embodiment(s) of the present disclosure includes a housing side section 22, a housing bottom section 25, and inner guides 26.

The housing side section 22 which forms the side surface of the housing body 20 supports the periphery of the support unit 30, and has a ring or annular shape which extends downward.

The entrances 24 along the circumference of the housing side section 22 form passages through which the hot air 70 moves to the inside of the housing body 20. The entrances 24 comprise or constitute slots or ovals that may extend horizontally. A plurality of entrances 24 are along the housing side section 22.

The housing bottom section 25 is horizontally secured to the lowermost end or surface of the housing side section 22 and forms the bottom of the housing body 20.

The upper ends of the entrances 24 may have a height the same as or lower than the height of the upper end of the lower introduction hole section 162 from which the hot air 70 is discharged towards the side of the housing body 20. As a result, the hot air 70 may easily enter the entrances 24.

The inner guides 26 are connected to the inner surface of the housing side section 22 and project into the housing side section 22. The inner guides 26 may have any of a variety of shapes without departing from the technical concept that they guide the movement of the hot air 70 that enters into the housing body 20 through the entrances 24.

The inner guides 26 in accordance with embodiment(s) of the present disclosure incline and/or project into the housing side section 22 from an end of a corresponding entrance 24. For example, the inner guides 26 may have a horizontal angle with respect to the housing side section 22.

The hot air 70 that enters into the entrances 24 is guided by the inner guides 26 and forms a vortex flow. As a result, the contact area and/or contact time of the hot air 70 with the cooking object(s) 60 may increase.

Hereinafter, operations of the exemplary cooking container 4 for a cooking apparatus in accordance with embodiment(s) of the present disclosure will be described in detail.

The hot air 70 produced by the convection heater unit 300 moves towards the side of the housing body 20, and the hot air 70 contacting the rounded surface of the housing side section 22 may enter the housing body 20 through the entrances 24. The hot air 70 entering the housing body 20 through the entrances 24 rotates inside of the housing body 20, and its movement may be guided by the inner guides 26.

The hot air 70 creates a vortex flow inside of the housing body 20 may create another vortex flow while being rotated on or by the surfaces of the first support parts 34 in the support unit 30. As a result, the contact time of the support body section 31 and the cooking object(s) 60 with the hot air 70 may increase, thermal efficiency may improve, and the cooking time of the cooking object(s) 60 may decrease.

Furthermore, as the hot air 70 moving upward from the lowermost end or surface of the support unit 30 toward the uppermost end or surface of the support unit 30 stays (at least temporarily) in the concave grooves of the rounded support portions 38 in the second support parts 36, the contact time of the hot air 70 with the support body section 31 may increase, and heating of the support body section 31 may be easily implemented. Meanwhile, the heat and/or hot air from the lower heater unit 800 heats the cooking object(s) 60 in the same manner as in other embodiments.

By the above-described constructions, since the cooking containers 3 and 4 in accordance with various embodiments carry out frying by heating the cooking object(s) 60 on the support unit 30 with the hot air 70, it is possible to decrease the likelihood of safety-related accidents due to use of oil, the nutritional and/or health benefits of the cooked food may increase, and the cooking cost may be reduced.

Also, since the hot air 70 entering the housing unit 5 heats the cooking object(s) 60 while rotating (at least partially or substantially) in a spiral pattern, the contact time of the hot air 70 with the cooking object(s) 60 may increase, and it may be possible to reduce the cooking time.

Further, the rounded support portions 38 which support the cooking object(s) 60 may have a convex upward shape. Thus, the contact area between the cooking object(s) 60 and the support unit 30 may decrease, the contact area between the hot air 70 and the cooking object(s) 60 may increase, and it may be possible to shorten the cooking time.

Moreover, since the residence time of the hot air 70 moving upward through the support unit 30 in the housing bodies 10 and 20 and/or inside the cover unit 80 may increase, the cooking time of the cooking object(s) 60 may be reduced or shortened, and the cooking cost may decrease.

Hereafter, an exemplary cooking apparatus in accordance with one or more embodiment(s) of the present disclosure will be described with reference to drawings. For the sake of convenience in explanations, the same reference numerals will be used to refer to components and/or elements with the same construction(s) and/or function(s) as other embodiment(s) of the present disclosure, and detailed descriptions thereof will be omitted.

Figure 42:
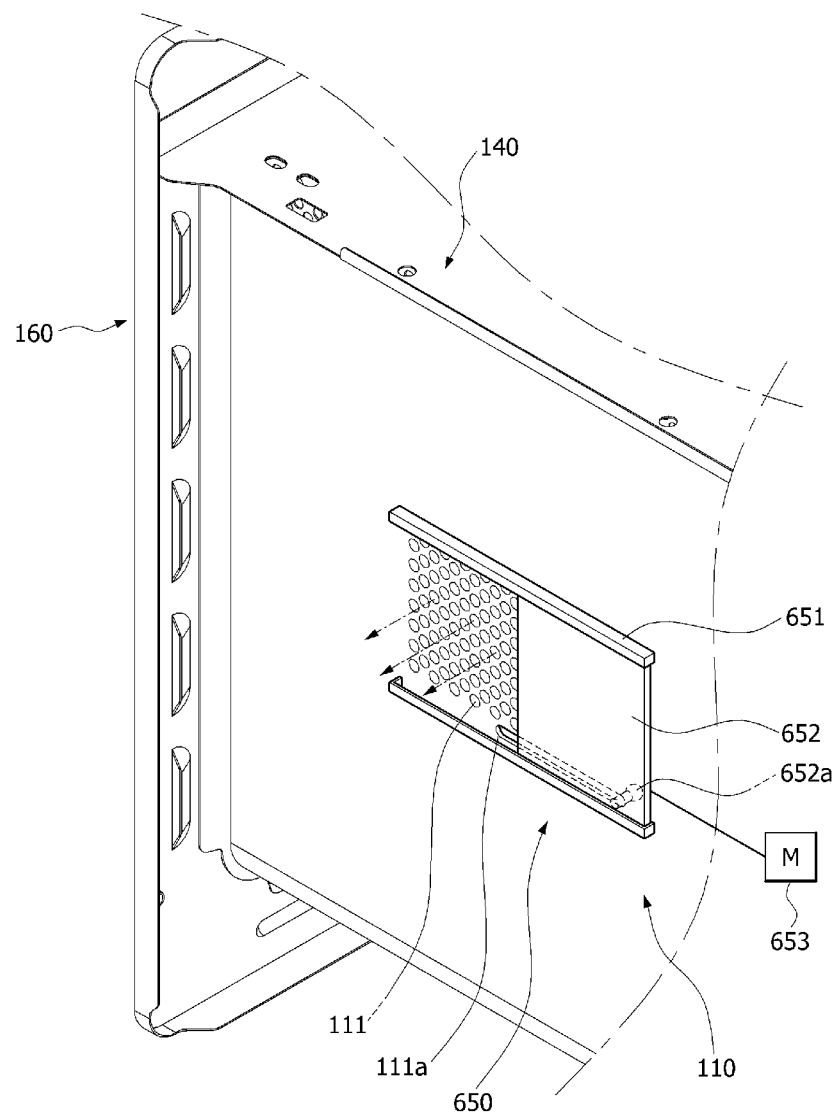
FIG. 42 is a perspective view illustrating an open discharge hole section in an exemplary cooking apparatus in accordance with one or more embodiments of the present disclosure.
Figure 43:
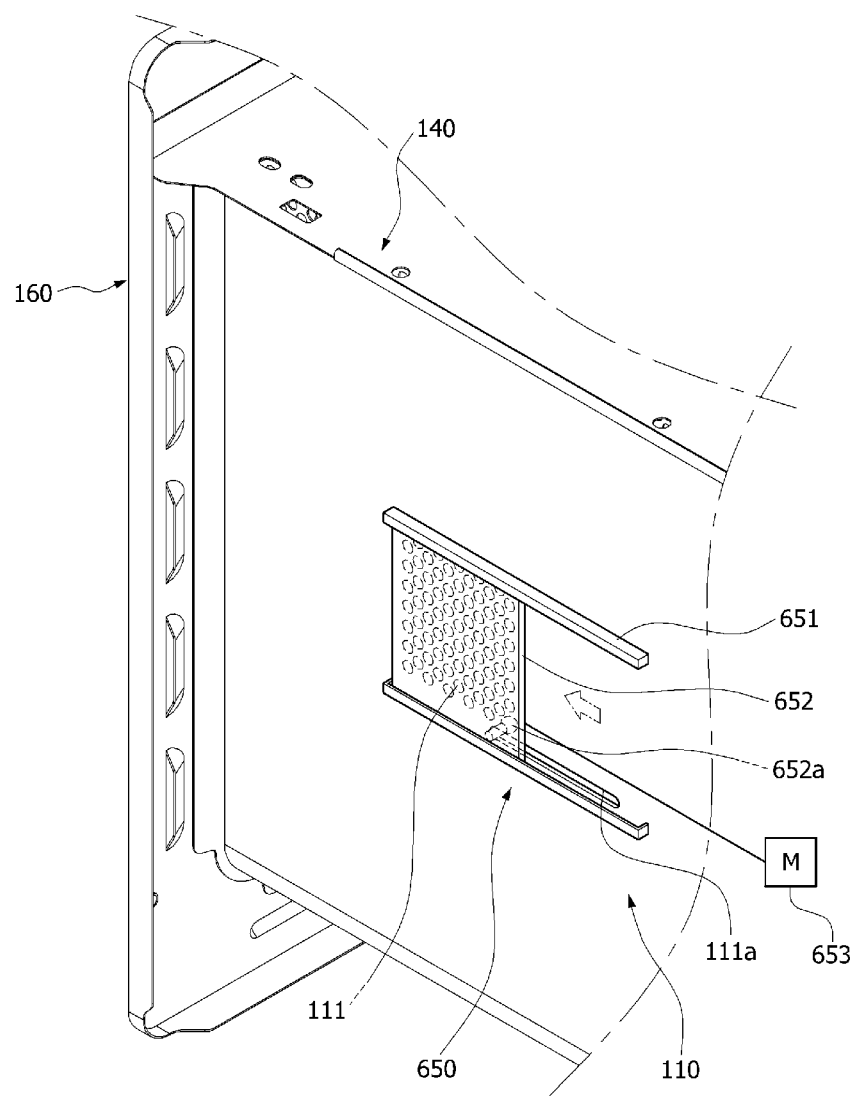
FIG. 43 is a perspective view illustrating a closed discharge hole section in the exemplary cooking apparatus in accordance with embodiment(s) of the present disclosure.
Figure 44:
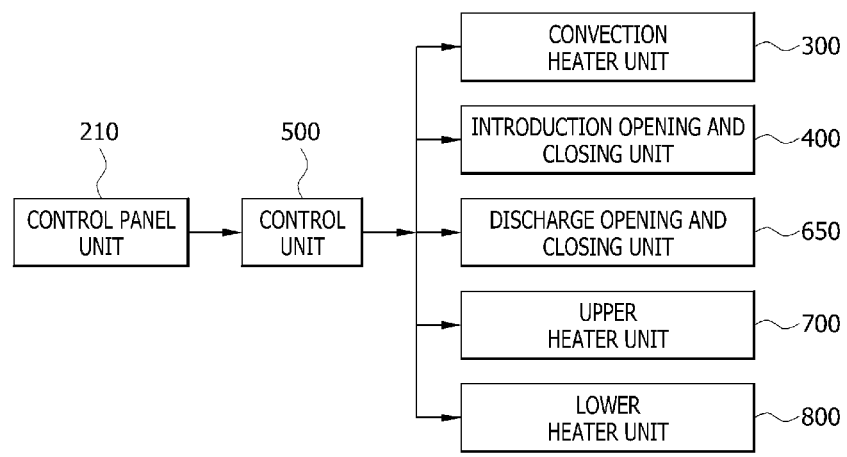
FIG. 44 is a block diagram schematically showing an exemplary control flow for a cooking apparatus in accordance with embodiment(s) of the present disclosure.

FIG. 42 is a perspective view illustrating an open discharge hole section in an exemplary cooking apparatus in accordance with one or more embodiments of the present disclosure, FIG. 43 is a perspective view illustrating a closed discharge hole section in the exemplary cooking apparatus in accordance with embodiment(s) of the present disclosure, and FIG. 44 is a block diagram schematically showing an exemplary control flow for the cooking apparatus in accordance with embodiment(s) of the present disclosure.

Referring to FIGS. 5, 6 and 42 to 44, a cooking apparatus in accordance with embodiment(s) of the present disclosure includes a cavity unit 100, a door unit 200, a cabinet unit 205, a convection heater unit 300, an introduction opening and closing unit 400, and a control unit 500, and may further include a discharge opening and closing unit 650, instead of a circulation duct unit.

The discharge opening and closing unit 650 opens and closes a discharge hole section 111. The discharge opening and closing unit 650 opens and closes the discharge hole section 111 according to the cooking mode.

In the general cooking mode, as the discharge opening and closing unit 650 opens the discharge hole section 111, air inside the cooking chamber C may be discharged outs of the cooking chamber C. As a result, in the general cooking mode, it is possible to prevent the temperature inside the cooking chamber C from rising excessively and/or the inside of the cooking chamber C from filling with steam or smoke.

In frying mode, the discharge opening and closing unit 650 closes the discharge hole section 111, and heat loss due to discharge of air in the cooking chamber C may be suppressed.

The discharge opening and closing unit 650 includes discharge rails 651 and a discharge opening and closing door 652. The discharge rails 651 are on the outer surface of a wall plate (e.g., the left wall plate 110). In one embodiment, a pair of discharge rails 651 are above and below the discharge hole section 111 and facing each other. The discharge opening and closing door 652 fits between the discharge rails 651, and the sliding movement of the discharge opening and closing door 652 may be guided and/or controlled by the pair of discharge rails 651.

The discharge rails 651 and the discharge opening and closing door 652 may comprise a heat-resistant material so that the discharge rails 651 and the discharge opening and closing door 652 do not degrade from the high temperature of the air inside the cooking chamber C.

A discharge opening and closing knob 652a may be on the discharge opening and closing door 652. In correspondence with the discharge opening and closing knob 652a, a discharge opening and closing slot 111a may be in the left wall plate 110.

The discharge opening and closing knob 652a is on the inner surface of the discharge opening and closing door 652 and projects toward the cooking chamber C by passing through the discharge opening and closing slot 111a. As the user moves the discharge opening and closing knob 652a which projects into the cooking chamber C through the left wall plate 110 left or right, the discharge opening and closing door 652 may slide and/or move leftward or rightward. The leftward and rightward movement of the discharge opening and closing knob 652a is guided and/or controlled by the discharge opening and closing slot 111a. Accordingly, the discharge opening and closing slot 111a may have a length corresponding to the movement length and/or distance of the discharge opening and closing knob 652a.

In this way, the discharge opening and closing knob 652a and the discharge opening and closing slot 111a are additionally provided enable the user to manually open or close the discharge hole section 111. Alternatively, the discharge opening and closing door 652 may be opened or closed automatically according to the cooking mode.

The discharge opening and closing unit 650 may further include a discharge opening and closing driving section 653. The discharge opening and closing driving section 653 is connected to the discharge opening and closing door 652 and slides or moves the discharge opening and closing door 652 left and right automatically. That is, the discharge opening and closing driving section 653 automatically opens or closes the discharge hole section 111 using the discharge opening and closing door 652 under the control of the control unit 500 when a cooking mode is selected using the control panel unit 210.

A driving device capable of automatically moving the discharge opening and closing door 652 left and right (or side to side, or horizontally) may comprise a motor and/or a mechanical cylinder.

According to embodiments of the present disclosure, it is possible to provide a cooking apparatus which can carry out not only general cooking but also frying.

According to embodiments of the present disclosure, since frying is carried out using the fat content in the cooking object(s), it is possible to prevent a safety-related accident due to high temperature oil, the nutritional and/or health benefits may increase, and the cooking cost may be reduced due to nonuse of oil.

According to embodiments of the present disclosure, defrosting and frying of a cooking object(s) may be simultaneously or sequentially carried out in one cooking apparatus, thereby improving user convenience.

According to embodiments of the present disclosure, frying and/or cooking may be carried out using both microwaves and hot air. As a result, the inside and the outside of the cooking object(s) may be evenly cooked when frying.

According to embodiments of the present disclosure, since the direction of hot air to be supplied in the cooking chamber may be adjusted and/or controlled using one or more introduction opening and closing units, cooking conditions may be optimized according to the cooking mode.

According to embodiments of the present disclosure, since hot air to be discharged out of the cooking chamber may be circulated back into the cooking chamber through a circulation duct unit, heat loss may be reduced or suppressed.

According to embodiments of the present disclosure, since it is possible to block hot air from being discharged outside of the cooking chamber using a duct opening and closing unit, heat loss may be reduced or suppressed.

According to embodiments of the present disclosure, the hot air entering the housing unit of a cooking container may heat the cooking object or objects while flowing in a spiral pattern. As a result, the contact time of the hot air with the cooking object(s) may increase, and it may be possible to shorten or reduce the cooking time and improve cooking performance.

According to embodiments of the present disclosure, rounded support portions configured to support the cooking object or objects may be convex facing upward, the contact area between the cooking object(s) and the support unit may decrease or be minimized, the contact area between the hot air and the cooking object(s) increases, the cooking time may decrease, and cooking performance may improve.

According to embodiments of the present disclosure, hot air discharged from heater units in the apparatus flowing onto a rounded side section of the housing of the cooking container may flow downward on the rounded surface and enter an entrance in the side section of the housing, which may reduce loss of hot air, and reduce or shorten the cooking time and/or improve cooking performance.

Embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A cooking apparatus comprising:
   a cavity unit having a cooking chamber, a top wall plate with an upper heater hole section, a bottom wall plate with a lower heater hole section, and a rear wall plate with an introduction hole section;
   a door on or over the cavity unit, configured to open and close an opening of the cavity unit;
   an upper heater unit installed on the top wall plate, configured to supply heat to the cooking chamber through the upper heater hole section;
   a lower heater unit installed on the bottom wall plate, configured to supply heat to the cooking chamber through the lower heater hole section;
   a convection heater unit installed on the rear wall plate, configured to supply heat to the cooking chamber through the introduction hole section; and
   an introduction opening and closing unit configured to open and close the introduction hole section and control an amount of heat supplied to the cooking chamber from the convection heater unit,
   wherein the introduction hole section comprises: an upper introduction hole section in an upper part of the rear wall plate; and a lower introduction hole section separate from the upper introduction hole section, in a lower part of the rear wall plate, and
   the introduction opening and closing unit comprises an upper opening and closing section configured to open and close the upper introduction hole section,
   wherein the upper opening and closing section comprises: upper rails installed on the rear wall plate; and an upper opening and closing door for opening and closing the upper introduction hole section by being slidingly moved along the upper rails.

2. The cooking apparatus according to claim 1, wherein the upper heater unit comprises:
   an upper heater over the top wall plate, configured to generate at least part of the heat; and
   an upper heater cover on or over the top wall plate, configured to cover the upper heater.

3. The cooking apparatus according to claim 1, wherein the lower heater unit comprises:
   a lower heater under the bottom wall plate, generating at least part of the heat; and
   a lower heater cover on or under the bottom wall plate, configured to cover the lower heater.

4. The cooking apparatus according to claim 1, wherein the convection heater unit comprises:
   a convection heater behind the rear wall plate, configured to generate at least part of the heat;
   a convection fan behind the rear wall plate;
   a convection motor configured to rotate the convection fan; and
   a convection heater cover on or behind the rear wall plate and configured to cover the convection heater and the convection fan.

5. The cooking apparatus according to claim 1, wherein:
   the introduction hole section further comprises a side introduction hole section in a side of the rear wall plate, and
   the introduction opening and closing unit further comprises a side opening and closing section configured to open and close the side introduction hole section.

6. The cooking apparatus according to claim 5, wherein the side opening and closing section comprises:
   side rails on the rear wall plate; and
   a side opening and closing door configured to open and close the side introduction hole section by sliding along the side rails.

7. The cooking apparatus according to claim 5, further comprising:
   a control unit configured to control operations of the upper opening and closing section and the side opening and closing section,
   wherein the control unit closes the upper opening and closing section and the side opening and closing section in a frying mode.

8. The cooking apparatus according to claim 1, further comprising a circulation duct unit connected to a discharge hole section in a side wall plate of the cavity unit, configured to guide air from the cooking chamber through the discharge hole section and back to the cooking chamber.

9. The cooking apparatus according to claim 8, wherein the circulation duct unit comprises:
- a circulation duct having one end connected to the discharge hole section and another end connected to a suction hole section of the side wall plate, configured to guide air from the discharge hole section to the suction hole section; and
- a duct opening and closing section in the circulation duct, configured to open and close an internal flow path of the circulation duct.

10. The cooking apparatus according to claim 9, wherein:
the circulation duct includes a discharge opening configured to discharge air entering through the discharge hole section out of the circulation duct, and
the duct opening and closing section closes the discharge opening when opening the internal flow path of the circulation duct, and opens the discharge opening when closing the internal flow path of the circulation duct.

11. The cooking apparatus according to claim 9, wherein one of the discharge hole section and the suction hole section is in an upper part of the side wall plate, and the other one of the discharge hole section and the suction hole section is in a lower part of the side wall plate.

12. The cooking apparatus according to claim 9, wherein one of the discharge hole section and the suction hole section is in a front part of the side wall plate, and the other one of the discharge hole section and the suction hole section is in a rear part of the side wall plate.

13. The cooking apparatus according to claim 1, further comprising a discharge opening and closing unit on the side wall plate configured to open and close a discharge hole section in a side wall plate of the cavity unit.

14. The cooking apparatus according to claim 13, wherein the discharge opening and closing unit comprises:
discharge rails on the side wall plate; and
a discharge opening and closing door that slides or moves along the discharge rails to open and close the discharge hole section.

15. The cooking apparatus according to claim 1, further comprising a cooking container including a housing unit having an entrance through which hot air enters and a support unit on the housing unit and on which one or more cooking objects to be cooked by the heat are placed.

16. The cooking apparatus according to claim 15, wherein the cooking container further includes a cover unit that covers the support unit and is configured to block movement of hot air.

17. The cooking apparatus according to claim 15, further comprising an introduction opening and closing unit configured to open and close the introduction hole section and control an amount of heat to be supplied to the cooking chamber from the convection heater unit.

* * * * *